United States Patent
Bodigutla et al.

(10) Patent No.: US 12,327,562 B1
(45) Date of Patent: Jun. 10, 2025

(54) SPEECH PROCESSING USING USER SATISFACTION DATA

(71) Applicant: Amazon Technologies, Inc., Seattle, WA (US)

(72) Inventors: Praveen Kumar Bodigutla, Cambridge, MA (US); Alborz Geramifard, Cambridge, MA (US); Swanand Arvind Joshi, Cambridge, MA (US); Joshua Levy, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 18/405,528

(22) Filed: Jan. 5, 2024

Related U.S. Application Data

(63) Continuation of application No. 15/934,052, filed on Mar. 23, 2018, now abandoned.

(51) Int. Cl.
*G10L 15/26* (2006.01)
*G06F 3/0482* (2013.01)
(Continued)

(52) U.S. Cl.
CPC .......... *G10L 15/222* (2013.01); *G06F 3/0482* (2013.01); *G06F 3/167* (2013.01);
(Continued)

(58) Field of Classification Search
CPC ... G10L 15/22; G10L 2015/223; G10L 15/26; G10L 2015/221; G10L 15/222; G10L 15/1822; G10L 25/30; G10L 15/00
See application file for complete search history.

(56) References Cited

U.S. PATENT DOCUMENTS 7,200,555 B1 * 4/2007 Ballard ............... G10L 15/22
704/E15.04
9,899,021 B1 * 2/2018 Vitaladevuni .......... G10L 15/14
(Continued)

FOREIGN PATENT DOCUMENTS

CN 108388926 A * 8/2018 ............. G06F 3/167

OTHER PUBLICATIONS

Williams; A Probabilistic Model of Human/Computer Dialogue with Application to a Partially Observable Markov Decision Process; First-year Report, Aug. 29, 2023; 52 pgs; Machine Intelligence Laboratory Department of Engineering University of Cambridge.
(Continued)

*Primary Examiner* — Olujimi A Adesanya
(74) *Attorney, Agent, or Firm* — K&L Gates LLP

(57) ABSTRACT

Devices and techniques are generally described for generating user satisfaction data in a natural language processing system. In various examples, first user input data may be received by a natural language processing system. Behavioral data related to the first user input data may be determined. Natural language processing error data related to the first user input data may be determined. First response data corresponding to the first user input data may be determined. First response characteristic data related to the first response data may be determined. First user satisfaction data may be determined based at least in part on the first response characteristic data, the behavioral data, and the natural language processing error data.

20 Claims, 10 Drawing Sheets

(51) Int. Cl.
*G06F 3/16* (2006.01)
*G06F 16/3329* (2025.01)
*G06N 7/01* (2023.01)
*G06N 20/00* (2019.01)
*G10L 13/00* (2006.01)
*G10L 15/18* (2013.01)
*G10L 15/22* (2006.01)
*G10L 15/30* (2013.01)
*G10L 25/30* (2013.01)
*G10L 15/08* (2006.01)

(52) U.S. Cl.
CPC ........... *G06F 16/3329* (2019.01); *G06N 7/01* (2023.01); *G06N 20/00* (2019.01); *G10L 13/00* (2013.01); *G10L 15/1815* (2013.01); *G10L 15/30* (2013.01); *G10L 2015/088* (2013.01); *G10L 2015/223* (2013.01)

(56) References Cited

U.S. PATENT DOCUMENTS

| | | | |
|---|---|---|---|
| 10,013,995 B1* | 7/2018 | Lashkari | G10L 21/0208 |
| 10,546,066 B2 | 1/2020 | Li et al. | |
| 10,854,191 B1 | 12/2020 | Geramifard et al. | |
| 10,896,679 B1* | 1/2021 | Hu | G10L 15/30 |
| 11,087,261 B1 | 8/2021 | Basu et al. | |
| 11,574,637 B1* | 2/2023 | Kumar | G10L 15/22 |
| 11,854,535 B1* | 12/2023 | Zhang | G10L 15/18 |
| 2004/0181457 A1 | 9/2004 | Biebesheimer et al. | |
| 2005/0125390 A1 | 6/2005 | Hurst-Hiller et al. | |
| 2006/0206337 A1* | 9/2006 | Paek | G10L 15/065 704/E15.009 |
| 2007/0106497 A1 | 5/2007 | Ramsey et al. | |
| 2008/0168099 A1 | 7/2008 | Skaf et al. | |
| 2009/0112586 A1* | 4/2009 | Williams | G10L 15/01 704/E15.001 |
| 2009/0306995 A1* | 12/2009 | Weng | G06Q 10/103 704/235 |
| 2010/0235451 A1* | 9/2010 | Yu | G06F 15/16 709/206 |
| 2011/0144999 A1 | 6/2011 | Jang et al. | |
| 2012/0005219 A1 | 1/2012 | Apacible et al. | |
| 2012/0053945 A1 | 3/2012 | Gupta et al. | |
| 2012/0290509 A1 | 11/2012 | Heck et al. | |
| 2013/0066661 A1 | 3/2013 | Biebesheimer et al. | |
| 2013/0283168 A1 | 10/2013 | Brown et al. | |
| 2014/0188476 A1 | 7/2014 | Li et al. | |
| 2015/0100943 A1 | 4/2015 | Gabel et al. | |
| 2015/0195406 A1 | 7/2015 | Dwyer et al. | |
| 2015/0279360 A1 | 10/2015 | Mengibar et al. | |
| 2015/0324361 A1 | 11/2015 | Glass et al. | |
| 2015/0348551 A1 | 12/2015 | Gruber et al. | |
| 2016/0042735 A1* | 2/2016 | Vibbert | G10L 15/1822 704/257 |
| 2016/0070696 A1 | 3/2016 | Lavallee et al. | |
| 2016/0103833 A1 | 4/2016 | Sanders et al. | |
| 2016/0132892 A1 | 5/2016 | Zhou et al. | |
| 2016/0247110 A1* | 8/2016 | Sinha | G06Q 10/06316 |
| 2016/0300135 A1* | 10/2016 | Moudy | G06F 40/40 |
| 2016/0344868 A1 | 11/2016 | Conway et al. | |
| 2017/0032791 A1 | 2/2017 | Elson et al. | |
| 2017/0161665 A1 | 6/2017 | Iwata et al. | |
| 2018/0025360 A1 | 1/2018 | Gorny | |
| 2018/0054523 A1 | 2/2018 | Zhang et al. | |
| 2018/0190264 A1* | 7/2018 | Mixter | G10L 15/22 |
| 2018/0210619 A1 | 7/2018 | Mowatt et al. | |
| 2018/0218080 A1* | 8/2018 | Krishnamurthy | G06F 16/9535 |
| 2018/0226066 A1* | 8/2018 | Harris | G06F 40/35 |
| 2018/0286401 A1 | 10/2018 | Oh et al. | |
| 2018/0293484 A1 | 10/2018 | Wang et al. | |
| 2018/0329998 A1 | 11/2018 | Thomson et al. | |
| 2019/0102145 A1* | 4/2019 | Wilberding | H04L 12/282 |
| 2019/0115027 A1* | 4/2019 | Shah | G10L 17/22 |
| 2019/0139537 A1 | 5/2019 | Akamine et al. | |
| 2019/0287533 A1 | 9/2019 | Homma et al. | |

OTHER PUBLICATIONS

Cuayahuitl et al.; Evaluation of a Hierarchical Reinforcement Learning Spoken Dialogue System; ScienceDirect, Computer Speech and Language; Jul. 14, 2009; pp. 395-429; vol. 24.

Frampton et al.; Recent Research Advances in Reinforcement Learning in Spoken Dialogue Systems; The Knowledge Engineering Review; 2009; pp. 375-408; vol. 24:4.

Su et al.; Learning from Real Users: Rating Dialogue Success with Neural Networks for Reinforcement Learning in Spoken Dialogue Systems; Aug. 13, 2015; 5 pgs; Department of Engineering University of Cambridge, Cambridge, UK.

Ultes; Improving Interaction Quality Estimation with BiLSTMs and the Impact on Dialogue Policy Learning; Proceedings of the SIGDial 2019 Conference; Sep. 11, 2019; pp. 11-20.

* cited by examiner

SPEECH PROCESSING USING USER SATISFACTION DATA

CROSS-REFERENCE TO RELATED APPLICATIONS

This application is a continuation of and claims priority to U.S. patent application Ser. No. 15/934,052, filed Mar. 23, 2018. The disclosure of the foregoing application is incorporated herein by reference in its entirety.

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wake-word" or "wake command". Natural language processing is used to translate the spoken commands into computer-executable instructions. The executable instructions are executed and a corresponding task is performed. Such speech recognition and voice control may be used by personal computers, hand-held devices, telephone computer systems, and a wide variety of other computing devices to improve human-computer interactions.

DETAILED DESCRIPTION

Figure 1:
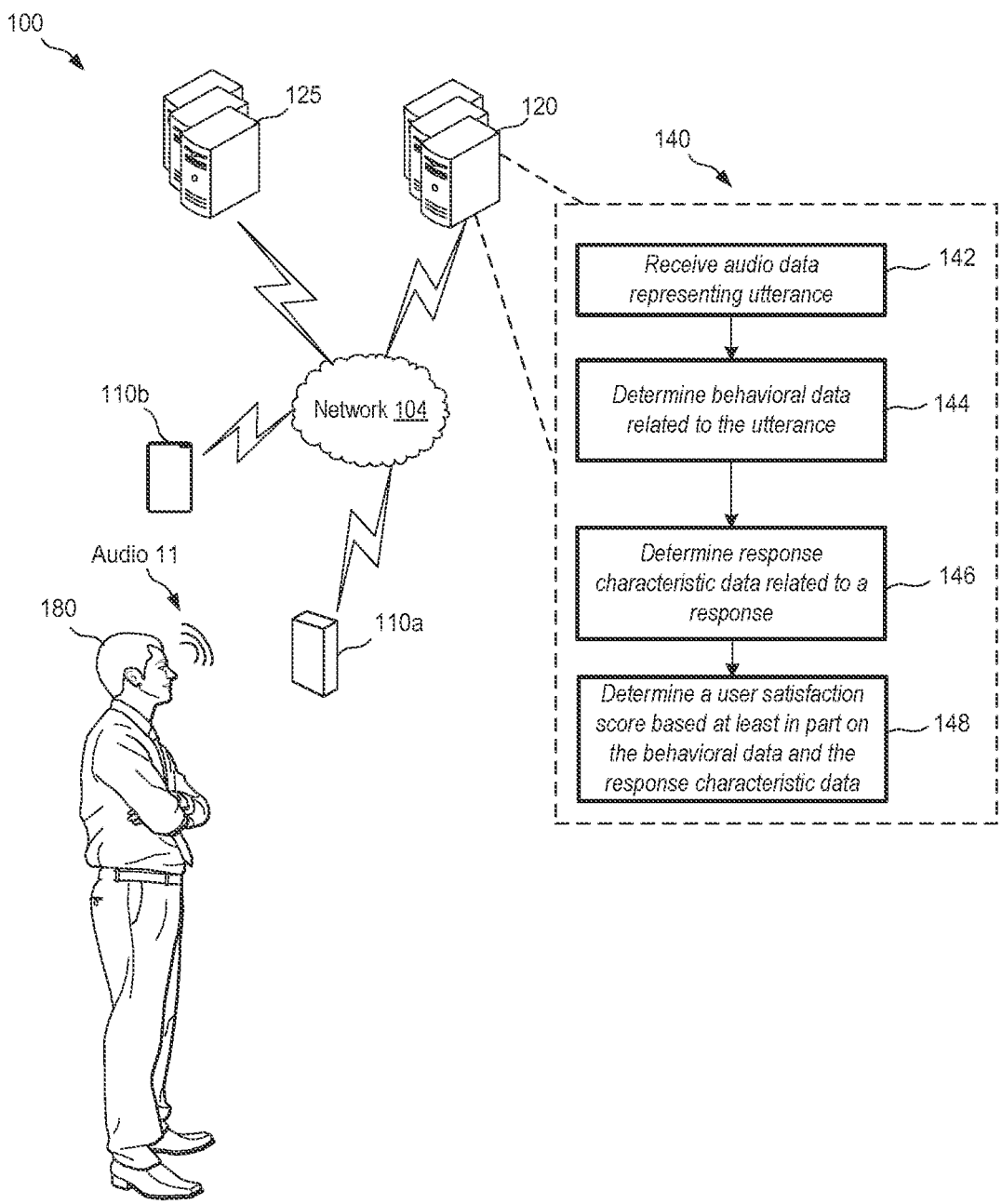
FIG. 1 is a conceptual illustration of a system configured to generate user satisfaction data in speech processing according to various embodiments of the present disclosure.

In the following description, reference is made to the accompanying drawings that illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, rather than specific commands or instructions. Text-to-speech (TTS) is a field of computer science, artificial intelligence, and linguistics concerned with enabling computers to output synthesized speech. ASR, NLU, and TTS may be used together as part of a natural language processing system.

A natural language processing system may answer user commands requesting the output of content. For example, a user may say "Computer, what is the weather." In response, the system may output weather information. For further example, a user may say "Computer, play music from the 90's." In response, the system may output music from the 1990's. In various examples, natural language processing systems may be effective to receive user input data in the form of a spoken user utterance (e.g., input audio data of the user utterance), input text, input video data, and/or other input data corresponding to natural language. The natural language processing system may be effective to interpret the natural language of the user input data and may generate an appropriate response using the various techniques described in further detail below. In various examples, natural language processing may include ASR, natural language understanding (NLU), or both.

The system may be configured with multiple applications/skills (e.g., thousands or tens of thousands of applications) that can be used to potentially respond to a user command. For example, the system may include weather applications, music applications, video applications, calendar applications, timer applications, general knowledge answering applications, game applications, etc. Further, the system may be capable of operating many different applications that have an overlapping subject matter. For example, the system may include more than one application that can execute commands related to requests for weather information. For further example, the system may include one or more medical information applications that execute commands requesting medical information. Determining which application or applications may be applicable to handle an incoming user command is a non-trivial problem.

The system may determine, in parallel, which of the entirety of the system's applications may potentially execute a given command. For example, when the system receives a command, the system may determine, for each application, the portions of the command that may be relevant to the application's execution of the command as well as one or more intents related to the particular application to which the command potentially relates.

In accordance with embodiments of the present disclosure, natural language processing systems may generate user satisfaction data based on user interaction with the natural language processing system. The user satisfaction data may be an estimate of a user's current satisfaction during the user's interaction with the natural language processing system. The user satisfaction data may be a quantitative estimate of user satisfaction and may be used by a natural language processing system in online and/or offline contexts. In an online context, the user satisfaction data may be used in both rule-based and stochastic approaches to select a best action to take in response to a user request. For example, the user satisfaction data may be used to select a relevant response to a user query from among multiple potential responses. Additionally, in an online context, the user satisfaction data may be used by a dialog manager to train a machine learning model such as a dialog policy framework. In various examples, a dialog policy machine learning framework may be able to determine user satisfaction scores for different potential actions that may be taken in response to a user input. The dialog policy machine learning framework may be effective to select the potential action that corresponds with the highest user satisfaction score. Further, the user satisfaction data may be used in an online context to measure an impact of newly added or updated applications (sometimes referred to as "skills") configured to respond to user requests made through the natural language processing systems described herein.

In an offline context, the user satisfaction data may be used to measure the performance of skills from the perspective of a user of the skills. For example, the user satisfaction data may be stored and accessible through an offline "dashboard" (e.g., an application effective to store and display user satisfaction data for particular applications). Offline user satisfaction data may be used to determine trends in user satisfaction at various levels of generality/granularity. For example, as described in further detail below, trends in user satisfaction data may be depicted at the application level, at the intent level, utterance level, etc. The offline dashboard may be configurable and may allow a selection of different options for data visualization (e.g., the time period and/or the level of generality/granularity at which to depict visualization(s) of the user satisfaction data). In some further examples, the user satisfaction data may be used in an offline context to identify errors in components of the natural language processing systems (e.g., errors in automatic speech recognition components and/or natural language understanding components). In some further examples, the user satisfaction data may be used for offline training of machine learning dialog policy models of the dialog manager.

FIG. 1 illustrates a system 100 configured to generate user satisfaction data in natural language processing systems according to various embodiments of the present disclosure. Although the figures and discussion illustrate certain operational steps of the system 100 in a particular order, in other embodiments the steps described may be performed in a different order (as well as certain steps removed or added). As shown in FIG. 1, the system 100 includes one or more computing devices 110 (e.g., devices 110a-110b) local to a user 180, one or more voice service computing devices 120 (e.g., voice service servers), and one or more application computing devices 125 (e.g., application servers) in communication with each other across one or more networks 104. The voice service computing device(s) 120 (which may be one or more different physical devices) may be capable of performing natural language processing (e.g., ASR and NLU) as well as non-speech processing operations as described herein. A single device 120 may perform all natural language processing or multiple devices 120 may combine to perform all natural language processing.

As shown in FIG. 1, a device 110a may receive audio 11 including a spoken utterance of a user 180 via a microphone (or array of microphones) of the device 110a. The device 110a generates input audio data corresponding to the audio 11, and sends the input audio data to the computing device(s) 120 for processing. Alternatively, a device 110b may receive text input by the user 180 via either a physical keyboard or virtual keyboard presented on a touch sensitive display of the device 110b. The device 110b generates input text data corresponding to the text, and sends the input text data to the computing device(s) 120 for processing. In other embodiments, the device 110b may detect spoken commands and perform speech recognition processing locally at the device 110b in order to translate those spoken commands into text data, which the device 110b then sends to the computing device(s) 120.

The voice service computing device(s) (e.g., servers) 120 receives input data from a device (110a/110b). If the input data is the input audio data from the device 110a, the computing device(s) 120 performs speech recognition processing (e.g., ASR) on the input audio data to generate input text data. The computing device(s) 120 may determine a shortlist of applicable applications for a given utterance embedding, as described in further detail below. The computing device(s) 120 performs natural language processing on input text data (either received from the device 110b or generated from the input audio data received from the device 110a) to determine a user command. A user command may correspond to a user request for the system to output content to the user. The requested content to be output may correspond to music, video, search results, weather information, etc.

The computing device(s) 120 determines output content responsive to the user command. The output content may be received from a first party (1P) application (e.g., an application controlled or managed by the voice service computing device(s) 120 or by the company or entity controlling the voice service computing device(s) 120) or a third party (3P) application (e.g., an application managed by an application computing device(s) 125 in communication with the computing device(s) 120 but not controlled or managed by the computing device(s) 120 or by the entity controlling the voice service computing device(s) 120). The computing device(s) 120 sends back to the initiating device (110a/110b) output data including the output content responsive to the user command. The device (110/110b) may emit the output data as audio, present the output data on a display, or perform some other operation responsive to the user command.

The computing device(s) 120 may determine output content responsive to the user command by performing an action. For example, in response to the user command, the computing device(s) 120 may determine one or more actions that correspond to the user command and may select one of the actions to perform. Examples of actions include launching an application (e.g., sending dialog data or other data to a specific application to be processed, which may correspond to a dispatch request), performing disambiguation (e.g., determining that the computing device(s) 120 doesn't have enough information to execute a command and generating a dialog request that requests additional information from the user), confirming the action with a user (e.g., generating audio data and/or display data indicating the action to be performed and requesting confirmation from the user), displaying information to the user (e.g., generating display data in response to the user command, such as displaying a second page of content), playing audio information for the user (e.g., generating audio data in response to the user command, such as indicating that the application is being launched, that a volume has been changed, and/or the like), or the like.

The device 110*a* may, thereafter, receive second audio including a spoken utterance of a user 180 captured by a microphone (or array of microphones) of the device 110*a*. The device 110*a* generates second input audio data corresponding to the second audio 11, and sends the second input audio data to the computing device(s) 120 for processing. Alternatively, the device 110*b* may receive second text input by the user 180. The device 110*b* generates second input text data corresponding to the second text, and sends the second input text data to the computing device(s) 120 for processing.

Computing device(s) 120 may be effective to perform one or more actions of a process flow 140 in accordance with various embodiments described herein. The actions of the process flow 140 may represent a series of instructions comprising computer-readable machine code executable by one or more processing units of computing device(s) 120. In various examples, the computer-readable machine codes may be comprised of instructions selected from a native instruction set of computing device(s) 120 and/or an operating system of computing device(s) 120.

In various examples, the process flow 140 may begin at action 142, "Receive audio data representing utterance". At action 142, computing device(s) 120 (e.g., the natural language processing system) may receive audio data (e.g., audio 11). The audio may represent an utterance by user 180 and may be a request for a speech-controlled voice personal assistant client executing on device 110*a* and/or 110*b* to generate a response and/or perform an action. In various examples, device 110*a* and/or 110*b* may generate the audio data representing the utterance in response to detection of a wake word spoken by the user 180. The device 110*a* and/or 110*b* may send the audio data representing the utterance over network 104 to computing device(s) 120 (and/or to computing device(s) 125) for further processing. In various other examples, instead of audio data, computing device(s) 120 may receive text data. In at least some examples where computing device(s) 120 receives text data, action 142 may be omitted.

In some examples, after receiving audio data representing an utterance or other user input, computing device(s) 120 may be effective to generate a response to the utterance. As described in further detail below in reference to FIG. 2, the various natural language processing components of computing device(s) 120 may be effective to determine a response to a user command and/or question present in the audio of the user utterance (or present in user input text) received at action 142. In at least some examples and as described in further detail below, user satisfaction data may be used, in part, in determining a response to a given utterance or other user input.

In further examples, the process flow 140 may continue from action 142 to action 144. At action 144, behavioral data related to the utterance may be determined. Behavioral data may generally describe characteristics of user input (e.g., characteristics of a user utterance and/or user input text). Behavioral data may include data indicating a rephrasing of user utterances and/or of portions thereof. Behavioral data may indicate that the user utterance represented a user barge-in wherein the user interrupted playback and/or a response generated by the natural language processing system. The previous list of behavioral data is not exhaustive and other types of behavioral data may be determined in place of and/or in addition to the particular examples listed. Behavioral data is described in further detail below in reference to FIG. 3.

In various other examples, the process flow 140 may continue from action 144 to action 146, "Determine response characteristic data related to the response." At action 146, response characteristic data may be determined. Response characteristic data may comprise indications of coherence between the user input data and the response data generated in response to the user input data. In various examples, user input data may include audio data of a user utterance, input user text data, and/or input user video data. In various examples, response data may be generated by one or more applications of computing device(s) 120, 125. In some examples, response data may comprise audio data and/or text data for responding to a user input data (e.g., a user utterance). In various examples, response data generated in response to user input data may be a command effective to initiate audio and/or video playback. In some other examples, response data generated in response to user input data may include text data that may be sent to a TTS component to generate an audio response to the user input data. In some examples, response data may be output (e.g., displayed and/or played back) by one or more device(s) 110*a*, 110*b* as output data.

In some further examples, response characteristic data may comprise an indication of the length of the response data when played back as audio. In various further examples, response characteristic data may comprise an indication of an apology in the response data. In some further examples, response characteristic data may comprise an indication of an affirmation and/or a negation in the response data. In some other examples, response characteristic data may comprise, an indication of filler word data. In yet other examples, response characteristic data may comprise confirmation request data wherein the natural language processing system confirms a user choice and/or instruction. The previous list of response characteristic data is not exhaustive and other types of response characteristic data may be used in place of and/or in addition to the particular examples listed. Response characteristic data is described in additional detail below in reference to FIG. 3.

In various examples, processing may continue from action 146 to action 148. At action 148, computing device(s) 120 may be effective to determine a user satisfaction score based at least in part on the behavioral data and the response characteristic data. As described in further detail below, a user satisfaction estimator of computing device(s) 120 may be effective to generate per-turn user satisfaction data (e.g., a per-turn user satisfaction score). A "turn" as used herein, may represent a user utterance (or other input) and a corresponding response from the natural language processing systems described herein. In various examples, the user satisfaction data may be used during run-time to select and/or optimize selection of responses to user input (e.g., by sending a "reward signal" comprising the user satisfaction scores to a machine learning model effective to select an appropriate action for a given user input). Additionally, the user satisfaction data may be stored and/or otherwise aggregated in a data visualization dashboard (described in further detail in reference to FIGS. 7A, 7B, and 7C below) that may be used by developers to discover trends in user satisfaction data. In the context of off-line usage of the user satisfaction data, a particular user satisfaction score at a particular time may be evaluated in light of past user satisfaction scores and subsequent (e.g., "future" user satisfaction scores) to determine a trend in user satisfaction for the particular scenario.

An audio capture component, such as a microphone or array of microphones of a device 110, captures the input audio 11 corresponding to a spoken utterance. The device 110, using a wakeword detection component, processes audio data corresponding to the input audio 11 to determine if a keyword (e.g., a wakeword) is detected in the audio data. Following detection of a wakeword, the device 110 sends audio data corresponding to the utterance, to a computing device(s) 120 for processing.

Upon receipt by the computing device(s) 120, the audio data may be sent to an orchestrator component 230. The orchestrator component 230 may include memory and logic that enable the orchestrator component 230 to transmit various pieces and forms of data to various components of the system.

The orchestrator component 230 sends the audio data to a speech recognition component 250. Speech recognition component 250 may transcribe the audio data into text data representing words of speech contained in the audio data. The speech recognition component 250 interprets the spoken utterance based on a similarity between the spoken utterance and pre-established language models. For example, the speech recognition component 250 may compare the audio data with models for sounds (e.g., subword units or phonemes) and sequences of sounds to identify words that match the sequence of sounds spoken in the utterance of the audio data.

Results of speech recognition processing (e.g., text data representing speech) are processed by a natural language understanding component 260 of the speech processing component 240. The natural language understanding component 260 attempts to make a semantic interpretation of the text data. That is, the natural language understanding component 260 determines the meaning behind the text data based on the individual words in the text data and then implements that meaning. The natural language understanding component 260 interprets a text string to derive an intent or a desired action from the user as well as the pertinent pieces of information in the text data that allow a device (e.g., the device 110, the computing device(s) 120, the application computing device(s) 125, etc.) to complete that action. For example, if a spoken utterance is processed using the speech recognition component 250, which outputs the text data "call mom", the natural language understanding component 260 may determine the user intended to activate a telephone in his/her device and to initiate a call with a contact matching the entity "mom."

The natural language understanding component 260 may be configured to determine a "domain" of the utterance so as to determine and narrow down which services offered by an endpoint device (e.g., the computing device(s) 120, 125, or the device 110) may be relevant. For example, an endpoint device may offer services relating to interactions with a telephone service, a contact list service, a calendar/scheduling service, a music player service, etc. Words in a single textual interpretation may implicate more than one service, and some services may be functionally linked (e.g., both a telephone service and a calendar service may utilize data from a contact list). In various examples, a domain may be associated with a set of applications. In various examples, some applications may be specific to a particular domain. In some examples, other applications may be applicable to multiple domains.

The natural language understanding component 260 may include a recognizer that includes a named entity resolution (NER) component configured to parse and tag to annotate text as part of natural language processing. For example, for the text "call mom," "call" may be tagged as a command to execute a phone call and "mom" may be tagged as a specific entity and target of the command. Moreover, the telephone number for the entity corresponding to "mom" stored in a contact list may be included in the NLU results. Further, the natural language understanding component 260 may be used to provide answer data in response to queries, for example using a natural language knowledge base.

In natural language processing, a domain may represent a discrete set of activities having a common theme, such as "shopping," "music," "calendaring," "communications," etc. As such, each domain may be associated with a particular recognizer, language model and/or grammar database, a particular set of intents/actions, and a particular personalized lexicon. Each gazetteer may include domain-indexed lexical information associated with a particular user and/or device. A user's music-domain lexical information (e.g., a gazetteer associated with the user for a music domain) might correspond to album titles, artist names, and song names, for example, whereas a user's contact-list lexical information (e.g., a gazetteer associated with the user for a contact domain) might include the names of contacts. Since every user's music collection and contact list is presumably different, this personalized information improves entity resolution. A lexicon may represent what particular data for a domain is associated with a particular user. The form of the lexicon for a particular domain may be a data structure, such as a gazetteer. A gazetteer may be represented as a vector with many bit values, where each bit indicates whether a data point associated with the bit is associated with a particular user. For example, a music gazetteer may include one or more long vectors, each representing a particular group of musical items (such as albums, songs, artists, etc.) where the vector includes positive bit values for musical items that belong in the user's approved music list. Thus, for a song gazetteer, each bit may be associated with a particular song, and for a particular user's song gazetteer the bit value may be 1 if the song is in the particular user's music list. Other data structure forms for gazetteers or other lexicons are also possible.

As noted above, in traditional natural language processing, text data may be processed applying the rules, models, and information applicable to each identified domain. For example, if text represented in text data potentially implicates both communications and music, the text data may, substantially in parallel, be natural language processed using the grammar models and lexical information for communications, and natural language processed using the grammar models and lexical information for music. The responses based on the text data produced by each set of models is scored, with the overall highest ranked result from all applied domains being ordinarily selected to be the correct result. In various examples, a shortlister component may reduce the computational burden of the processing by the natural language understanding component 260 by determining a subset of the most applicable applications for a particular utterance. For example, the natural language understanding component 260 may perform the natural language processing for the subset n applications having the highest probabilities that the application is programmed to process and/or respond to the user utterance and/or the text data.

A downstream process called named entity resolution may link a text portion to an actual specific entity known to the system. To perform named entity resolution, the system may utilize gazetteer information stored in an entity library storage. The gazetteer information may be used for entity resolution, for example matching speech recognition results with different entities (e.g., song titles, contact names, etc.). Gazetteers may be linked to users (e.g., a particular gazetteer may be associated with a specific user's music collection), may be linked to certain domains (e.g., shopping, music, communications), or may be organized in a variety of other ways. The NER component may also determine whether a word refers to an entity that is not explicitly mentioned in the text data, for example "him," "her," "it," or other anaphora, exophora, or the like.

A recognizer of the natural language understanding component 260 may also include an intent classification (IC) component that processes text data to determine an intent(s), where the intent(s) corresponds to the action to be performed that is responsive to the user command represented in the text data. Each recognizer is associated with a database of words linked to intents. For example, a music intent database may link words and phrases such as "quiet," "volume off," and "mute" to a "mute" intent. The IC component identifies potential intents by comparing words in the text data to the words and phrases in the intents database. Traditionally, the IC component determines using a set of rules or templates that are processed against the incoming text data to identify a matching intent.

In order to generate a particular interpreted response, the NER component applies the grammar models and lexical information associated with the respective recognizer to recognize a mention of one or more entities in the text represented in the text data. In this manner the NER component identifies "slots" (i.e., particular words in text data) that may be needed for later command processing. Depending on the complexity of the NER component, it may also label each slot with a type (e.g., noun, place, city, artist name, song name, or the like). Each grammar model includes the names of entities (i.e., nouns) commonly found in speech about the particular domain (i.e., generic terms), whereas the lexical information from the gazetteer is personalized to the user(s) and/or the device. For instance, a grammar model associated with the shopping domain may include a database of words commonly used when people discuss shopping.

The intents identified by the IC component are linked to domain-specific grammar frameworks with "slots" or "fields" to be filled. Each slot/field corresponds to a portion of the text data that the system believes corresponds to an entity. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER component may parse the text data to identify words as subject, object, verb, preposition, etc., based on grammar rules and/or models, prior to recognizing named entities. The identified verb may be used by the IC component to identify intent, which is then used by the NER component to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component then searches the corresponding fields in the domain-specific and personalized lexicon(s), attempting to match words and phrases in the text data tagged as a grammatical object or object modifier with those identified in the database(s). As used herein, "intent data" may correspond to the intent itself, framework(s) for the intent, slot(s)/field(s) corresponding to the intent, object modifier(s), any information associated with the intent/framework(s)/slot(s), or any combination thereof without departing from the disclosure.

To illustrate an example, a command of "book me a plane ticket from Boston to Seattle for July 5" may be associated with a <BookPlaneTicket> intent. The <BookPlaneTicket> intent may be associated with a framework including various slots including, for example, <DepartureDate>, <DepartureLocation>, <ArrivalDate>, and <DestinationLocation>. In the above example, the computing device(s) 120, namely the natural language understanding component 260, may populate the framework as follows: <DepartureDate: July 5>, <DepartureLocation: Boston>, <ArrivalDate: July 5>, and <DestinationLocation: Seattle>.

This process includes semantic tagging, which is the labeling of a word or combination of words according to their type/semantic meaning. Parsing may be performed using heuristic grammar rules, or the NER component may be constructed using techniques such as Hidden Markov models (HMMs), maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the text data.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component may search a database of generic words associated with the domain. For example, if the text data corresponds to "play songs by the rolling stones," after failing to determine an album name or song name called "songs" by "the rolling stones," the NER component may search the domain vocabulary for the word "songs." In the alternative, generic words may be checked before the gazetteer information, or both may be tried, potentially producing two different results.

The results of natural language processing may be tagged to attribute meaning to the text data. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The results of natural language processing may be sent to an application 290, which may be located on a same or separate computing device 120 as part of a system. The system may include more than one application 290, and the destination application 290 may be determined based on the natural language processing results and may be selected from the subset of applications determined by shortlister component 341 and/or by another component of computing device(s) 120 based on the probabilities determined by shortlister 341. For example, if the natural language processing results include a command to play music, the destination application 290 may be a music playing application, such as one located on the device 110 or in a music playing appliance, configured to execute a music playing command. If the natural language processing results include a search request (e.g., requesting the return of search results), the application 290 selected may include a search engine application, such as one located on a search server, configured to execute a search command and determine search results, which may include output text data to be processed by a text-to-speech engine and output from a device as synthesized speech.

The computing device(s) 120 may include a user recognition component. The user recognition component may take as input the audio data as well as the text data output by the speech recognition component 250. The user recognition component may receive the text data from the speech recognition component 250 either directly or indirectly via the orchestrator component 230. Alternatively, the user recognition component may be implemented as part of the speech recognition component 250. The user recognition component determines respective scores indicating whether the utterance in the audio data was spoken by particular users. The user recognition component also determines an overall confidence regarding the accuracy of user recognition operations. User recognition may involve comparing speech characteristics in the audio data to stored speech characteristics of users. User recognition may also involve comparing biometric data (e.g., fingerprint data, iris data, etc.) received by the user recognition component to stored biometric data of users. User recognition may further involve comparing image data including a representation of at least a feature of a user with stored image data including representations of features of users. It should be appreciated that other kinds of user recognition processes, including those known in the art, may be used. Output of the user recognition component may be used to inform natural language processing as well as processing performed by 1P and 3P applications 290.

The computing device(s) 120 may additionally include a dialog state manager 340. As described in further detail in reference to FIG. 2, dialog state manager 340 may receive various inputs from the orchestrator component 230, such as input audio data, N-best recognitions data, N-best intents data, user satisfaction data, etc. The dialog state manager 340 may generate dialog state data, including all of the data received that is associated with a current turn with the user. A "turn" as used herein, may represent a user utterance and a response from the various natural language processing systems described herein. As described in further detail below, the dialog state manager 340 may send the dialog state data to a core dialog manager that may determine one or more candidate actions based on the dialog state data.

The computing device(s) 120 may additionally include a user satisfaction estimator 350. User satisfaction estimator 350 may receive the dialog state data from the dialog state manager 340 (and/or from orchestrator component 230) and may generate user satisfaction data. Additionally, in at least some examples, user satisfaction estimator 350 may receive additional data from one or more other components of computing device(s) 120, 125 and/or other computing devices and may generate the user satisfaction data based at least in part on the additional data. In various examples, the user satisfaction data may represent a scalar value (e.g., an integer from 1-5 or some other set of values) indicating an estimate of overall user satisfaction for the current turn. The user satisfaction data may be sent to orchestrator component 230 and stored in user profile storage or in one or more local or remote memories. User satisfaction data stored in user profile storage (and/or in one or more other memories) may be incorporated into an offline user satisfaction system that may be used to improve skills and to gather data on current natural language processing trends, as described in further detail below. Additionally, user satisfaction data may be sent to dialog state manager 340 as a "reward signal". Dialog state manager 340 may update the dialog state data with the current user satisfaction data. Accordingly, the core dialog manager may determine a candidate action based at least in part on the current user satisfaction data. User satisfaction estimator 350 is described in addition detail below in reference to FIGS. 3 and 4.

The user profile storage may include data regarding user accounts. In some examples, the user profile storage may be implemented as part of the computing device(s) 120. However, it should be appreciated that the user profile storage may be located proximate to the computing device(s) 120, or may otherwise be in communication with the computing device(s) 120, for example, over the network(s) 104. The user profile storage may include a variety of information related to individual users, accounts, etc. that interact with the system.

In some examples, one or more of applications 290 may be 1P applications of the computing device(s) 120. However, it should be appreciated that the data sent to the 1P applications 290 may also be sent to (or instead be sent to) 3P application servers 125 executing 3P applications.

Application, as used herein, may be considered synonymous with a skill. A "skill" may correspond to a domain and may be software running on a computing device(s) 120 and akin to an application. That is, a skill may enable a computing device(s) 120 or application computing device(s) 125 to execute specific functionality in order to provide data or produce some other output called for by a user. The system may be configured with more than one skill. For example, a weather service skill may enable the computing device(s) 120 to execute a command with respect to a weather service computing device(s) 125, a car service skill may enable the computing device(s) 120 to execute a command with respect to a taxi service computing device(s) 125, an order pizza skill may enable the computing device(s) 120 to execute a command with respect to a restaurant computing device(s) 125, etc.

While the examples illustrated above describe discrete skills associated with a specific service, the disclosure is not limited thereto and an application (e.g., skill) may be associated with specific and/or general functions, including system functions associated with the computing device(s) 120. For example, the speech processing component 240, the speech recognition component 250, the user satisfaction estimator 350, the natural language understanding component 260, the dialog state manager 340, or the like may correspond to an application running on the computing device(s) 120 (e.g., the computing device(s) 120 sends input data to the application and the application generates output data). In general, an application or a skill may refer to a system process running on the computing device(s) 120, a first party application running on the computing device(s) 120, a third party application running on the computing device(s) 120 and/or the application computing device(s) 125, and/or the like without departing from the disclosure.

Output of the application/skill 290 may be in the form of text data to be conveyed to a user. As such, the application/skill output text data may be sent to a text-to-speech (TTS) component 280 either directly or indirectly via the orchestrator component 230. The TTS component 280 may synthesize speech corresponding to the received text data. Speech audio data synthesized by the TTS component 280 may be sent to a device 110 for output to a user.

The TTS component 280 may perform speech synthesis using one or more different methods. In one method of synthesis called unit selection, the TTS component 280 matches the text data or a derivative thereof against a database of recorded speech. Matching units are selected and concatenated together to form speech audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

Figure 2:
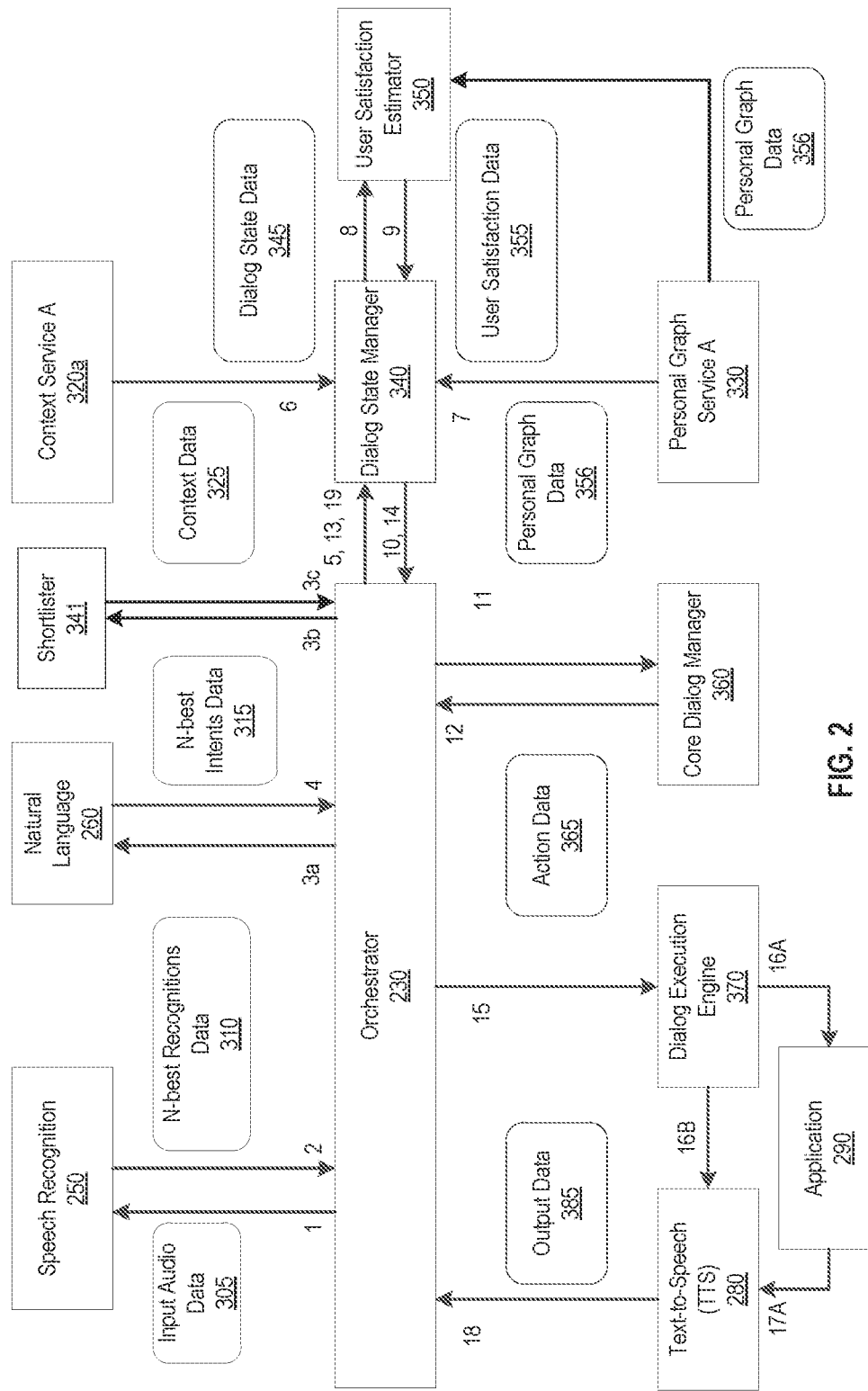
FIG. 2 is a conceptual diagram of components of a computing device(s) according to various embodiments of the present disclosure.

The computing device(s) 120 may further operate using various components and by sending various data between components, as illustrated in and described with respect to FIG. 2. The speech recognition component 250 receives [1] input audio data 305 from the orchestrator component 230. The speech recognition component 250 processes the input audio data 305 to generate an N-best list of text possibly representing an utterance in the input audio data 305. The speech recognition component 250 outputs [2] N-best recognitions data 310, including text representing the generated N-best recognitions, to the orchestrator component 230.

Shortlister component 341 may receive [3b] the N-best recognitions data 310 from the orchestrator component 230. Shortlister 341 may be trained using a set of applications (or "skills"). As described in further detail below, for each application in the set of applications, shortlister component 341 may determine a similarity score between a user utterance (or user input text) and utterances provided to for the application during training of shortlister component 341. Shortlister component 341, orchestrator component 230, and/or some other processing component of computing device(s) 120 may determine a subset of the applications based on the scores determined by shortlister component 341. Shortlister component 341 may send [3c] the subset of applications and/or the determined probabilities to orchestrator component 230. In various examples, to the extent that the natural language understanding component 260, the dialog state manager 340, the core dialog manager 360, and/or other components of computing device(s) 120 select an application to process the utterance (and/or input text), the natural language understanding component 260, the dialog state manager 340, the core dialog manager 360, and/or other components of computing device(s) 120 may select the application from the subset of applications and/or based on the probabilities determined by shortlister component 341.

The natural language understanding component 260 receives [3a] the N-best recognitions data 310, the application-specific probabilities determined by shortlister component 341, and/or the subset of applications determined by shortlister component 341 or by some other processing unit from the orchestrator component 230. The natural language understanding component 260 processes the N-best recognitions data 310, the application-specific probabilities, and/or the subset of applications to determine one or more domains of the computing device(s) 120 for the utterance. Each domain may be associated with a separate recognizer implemented within the natural language understanding component 260. A recognizer may include an NER component and an IC component as described above. The natural language understanding component 260 outputs [4] N-best intents data 315, representing an N-best list of the top scoring intents associated with the utterance (as received by the computing device(s) 120 as either a spoken utterance or textual input) to the orchestrator component 230 based on the subset of applications and/or the application-specific probabilities determined by shortlister 341. The orchestrator component 230 may send [5] the input audio data 305, the N-best recognitions data 310, the N-best intents data 315, the subset of applications, the application-specific probabilities determined by shortlister component 341, additional data, and/or any combination thereof to the dialog state manager 340.

The computing device(s) 120 may further include one or more context services 320. A context service 320 may be configured to output non-user specific context data, such as temporal information (e.g., time of day). A context service 320 may also be configured to output metadata associated with the device from which the user command was received. Examples of device metadata may include the type of device (e.g., car, phone, speaker, etc.) A context service 320 may further be configured to output data indicating previously received user commands and their determined intents. While FIG. 2 illustrates the context services 320 as a separate component, the disclosure is not limited thereto and one or more context services 320 may be included in the natural language understanding component 260 without departing from the disclosure. The context services 320 may generate context data 325, which may include information about the dialog context and/or other information. Thus, FIG. 2 illustrates the context services 320 sending [6] the context data 325 to the dialog state manager 340. However, the disclosure is not limited thereto, and the context services 320 may send the context data 325 to the dialog state manager 340, the natural language understanding component 260, and/or the orchestrator component 230 without departing from the disclosure.

In some examples, the context services 320 may include additional information relevant to applications and/or intents. For example, the context services 320 may include information about application ratings (e.g., 5 star rating for a first application and a 4 star rating for a second application), enabling the computing device(s) 120 to differentiate between similar applications based on ratings. In some other examples, the context services 320 may send the application probabilities determined by shortlister component 341 to dialog state manager 340. Additionally or alternatively, the context services 320 may have location information associated with applications, enabling the computing device(s) 120 to select the first application in a first location and the second application in a second location. For example, the first application (e.g., Skill A corresponding to a first transportation company) may not have availability in certain cities, while the second application (e.g., Skill B, corresponding to a second transportation company) has availability, so the computing device(s) 120 may select the second application when the user requests a cab in locations that the first application lacks coverage. Similarly, the context services 320 may include information about context of a user request, enabling the computing device(s) 120 to select a first application based on a first user request but select a second application based on a second user request. For example, a first user request (e.g., "What is the weather?") may result in the computing device(s) 120 choosing a first application (e.g., Weather skill), whereas a second user request (e.g., "What is the wind?") may result in the computing device(s) 120 choosing a second application (e.g., PredictWind skill), despite the similarity in the user requests.

The computing device(s) 120 may additionally include one or more personal graph services 330. A personal graph service 330 may track user interactions with the system 100 and store previous interactions, user preferences, and/or other user-specific information used to build a user profile. Thus, the personal graph services 330 may generate personal graph data and may send [7] the personal graph data to the dialog state manager 340 to include in the dialog state. In some examples, the personal graph data includes information specific to the current dialog state. For example, if the user request indicates that the user would like to request a ride, the personal graph data may indicate a first number of times that the user has used a first application (e.g., Skill A) and a second number of times that the user has used a second application (e.g., Skill B). This information is specific to the user but also relevant to the current dialog state. However, the disclosure is not limited thereto and the personal graph data may include additional information without departing from the disclosure.

While the abovementioned examples illustrate the personal graph service 330 being tailored to a specific user, the disclosure is not limited thereto. In some examples, the personal graph service 330 may provide information according to different hierarchies. As discussed above, the personal graph service 330 may provide profile data on a user level (e.g., based on a system interaction history specific to a user ID associated with a user from which the current command originated). In addition, the personal graph service 330 may alternatively provide profile data on a device level (e.g., based on a system interaction history specific to a device ID associated with the device from which data corresponding to the current command was received). Additionally or alternatively, the personal graph service 330 may provide profile data on a user and device level (e.g., based on a system interaction history specific to a user ID as well as a device ID).

The dialog state manager 340 may receive [5] various inputs from the orchestrator component 230, such as the input audio data 305, the N-best recognitions data 310, the subset of applications and/or the application probabilities determined by shortlister 341, and/or the N-best intents data 315. In addition, the dialog state manager 340 may receive [6] the context data 325 from the context service 320 and may receive [7] the personal graph data from the personal graph service 330. In various examples, personal graph data 356 may comprise a user preference data for one or more intents, slots, domains, and/or actions. In some further examples, personal graph data 356 may comprise geographical data based on one or more locations associated with a particular user and/or user account. In various examples, personal graph data 356 may be provided to user satisfaction estimator 350. In some other examples, personal graph data 356 may be sent to dialog state manager 340 and/or orchestrator component 230. Dialog state manager 340 and/or orchestrator component 230 may, in turn, send personal graph data 356 to user satisfaction estimator 350. The dialog state manager 340 may generate dialog state data 345, including all of the data received that is associated with a current exchange with the user, as discussed in greater detail below with regard to FIG. 7. The dialog state manager 340 may send [8] the dialog state to the user satisfaction estimator 350.

The user satisfaction estimator 350 may receive [8] the dialog state data 345 and may generate user satisfaction data 355, which may be a scalar value (e.g., between 1 and 5) that corresponds to an estimate of user satisfaction for a particular turn (e.g., a user utterance or other input followed by a response from computing device(s) 120. The user satisfaction estimator 350 may send [9] the user satisfaction data 355 to the dialog state manager 340 and the dialog state manager 340 may update the dialog state data 345 to include the user satisfaction data 355.

The system 100 may track the user satisfaction data 355 over a period of time. By associating the user satisfaction data 355 with a particular dialog state, the system 100 may determine changes in the user satisfaction values based on executing a particular action or command. For example, the system 100 may associate a first user satisfaction value with a first state, select an action and/or execute a command, and associate a second user satisfaction value with a second state. By comparing the first user satisfaction value to the second user satisfaction value, the system 100 may determine whether the selected action and/or command increased or decreased user satisfaction and by how much. Thus, when tracking user satisfaction values over a long period of time, the system 100 may optimize machine learning models (e.g., trained models) to select actions and/or commands that maximize user satisfaction values. Further, in at least some examples, instead of comparing user satisfaction values for each discrete decision to maximize user satisfaction at a specific point in time, the system 100 may compare an expected sum of user satisfaction values to maximize user satisfaction overall. In various examples, a higher user satisfaction score for a first action or natural language processing response and a lower user satisfaction score for a second action or natural language processing response may indicate that the first action is more likely to result in higher and/or user satisfaction.

The dialog state manager 340 may send [10] the dialog state data 345 to the orchestrator component 230 and/or the core dialog manager 360. Additionally or alternatively, the orchestrator component 230 may send [11] the updated dialog state to the core dialog manager 360. The core dialog manager 360 may use rule-based candidate generators and/or machine learning candidate generators (e.g., Deep Neural Network (DNN) generators) to generate candidate actions and/or applications based on the dialog state data 345 and may use rule-based selectors and/or machine learning selectors (e.g., DNN selectors) to select a single action from the candidate actions. Similarly, the core dialog manager 360 may use rule-based candidate selectors and/or machine learning candidate selectors (e.g., DNN selectors) to select a single application from the candidate applications to perform the action. In various examples, the probabilities generated by shortlister component 341 and/or the subset of applications determined by shortlister component 341 based on the probabilities may be used as an input signal to rule-based candidate selectors and/or machine learning candidate selectors to select the single application. The core dialog manager 360 may generate action data 365 that indicates the selected action, which may correspond to a dialog request or a dispatch request, and may send [12] the action data 365 to the orchestrator component 230 and/or the dialog state manager 340 (e.g., via the orchestrator component 230).

The dialog state manager 340 may receive [13] the action data 365 and may update the dialog state data 345 again to include the action data 365. The dialog state manager 340 may send [14] the updated dialog state data 345 to the orchestrator component 230, which may send [15] the updated dialog state data 345 to a dialog execution engine 370. The dialog execution engine 370 may receive [15] the updated dialog state data 345, including the action data 365, and may determine whether the action data 365 indicates that the dialog execution engine 370 should dispatch the action to an application (e.g., dispatch request) or to generate a prompt requesting additional information from the user (e.g., dialog request). For example, if the action data 365 includes a dispatch request, the dialog execution engine 370 may send [16A] the action data 365 and/or the dialog state data 345 to the application 290 specified by the action data 365. The application 290 may use rule-based action generators to generate candidate actions based on the dialog state data 345 and may use rule-based selectors and/or machine learning selectors (e.g., DNN selectors) to select a single action from the candidate actions. The application 290 may generate a prompt corresponding to the selected action and may generate an updated dialog state, which may be sent [17A] to the TTS component 280.

In contrast, if the action data 365 includes a dialog request, the dialog execution engine 370 may generate a prompt soliciting additional information from the user and may send [16B] the prompt and/or the dialog state data 345 to the TTS component 280. The solicitation may take the form of text output via a display of a user device or audio output by a speaker of a user device. Accordingly, if the solicitation to the user is to be audio, the TTS component 280 may generate output data 385 that includes output audio data based on the text data of the prompt. If the solicitation to the user does not include audio, the TTS component 280 may generate output data 385 that only includes the text data of the prompt. The TTS component 280 may send [18] the output data 385 and/or additional data received from the dialog execution engine 370 or the application 290 to the orchestrator component 230 and the orchestrator component 230 may send [19] the output data 385 and/or the additional data to the dialog state manager 340, which may update the dialog state data 345 again.

In some examples, the core dialog manager 360 may determine that the dialog state data 345 includes enough information to select an action and generate a dispatch request to dispatch the selected action and/or dialog state to the selected application. For example, in response to a user request to "book me a cab to Favorite Bar," the core dialog manager 360 may determine that the intent is to book a cab (e.g., GetCabIntent) and may generate candidate actions associated with booking a cab, such as a first action using a first application (e.g., Skill A) and a second action using a second application (e.g., Skill B). In various examples, Skill A and Skill B may be included in a subset of applications determined by shortlister component 341 for the utterance "book me a cab to Favorite Bar". In various other examples, the probabilities that Skill A and Skill B are appropriate applications to process the utterance "book me a cab to Favorite Bar" may exceed a probability threshold. In still other examples, the probabilities that Skill A and Skill B are appropriate applications to process the utterance "book me a cab to Favorite Bar" may be among the highest probabilities determined by shortlister component 341 for the set of skills for which shortlister component 341 has been trained. The core dialog manager 360 may communicate with the first application and/or the second application to acquire more information, such as whether cars are available (e.g., Skill A indicates that no cars are available for 30 minutes, whereas Skill B indicates that a car is available within 5 minutes). Based on the dialog state data 345 and the additional information, the core dialog manager 360 may select the second action and generate a dispatch command, with the action data 365 indicating that the system 100 should dispatch the second action to the second application.

In some examples, dispatching the second action to the second application corresponds to sending the second action (e.g., Dispatch(Skill B: GetCabIntent(Current location: 2121 7$^{th}$ Avenue Seattle, Destination: Favorite Bar)) to the second application for execution. However, the second action is determined by the core dialog manager 360 processing the dialog state data 345 and the core dialog manager 360 is not specifically trained for intents/actions associated with the second application. Therefore, dispatching the second action to the second application may instead correspond to updating the dialog state data 345 with the second action and/or any additional information and sending the dialog state data 345 to the second application for further processing. For example, the core dialog manager 360 may send the selected action (e.g., Dispatch(Skill B: GetCabIntent(Current location: 2121 7$^{th}$ Avenue Seattle, Destination: Favorite Bar)), the additional information (e.g., Skill A indicates that cars are not available for 30 minutes, Skill B indicates that cars are available within 5 minutes), and/or any other information (e.g., Reason: Skill A outage) to the dialog state manager 340; the dialog state manager 340 may update the dialog state data 345 accordingly, and the updated dialog state data 345 may be sent to the second application.

While the examples described above illustrate the second action including an intent (e.g., Dispatch(Skill B: GetCabIntent)), the disclosure is not limited thereto and the second action may only correspond to dispatching to the second application (e.g., Dispatch(Skill B)). Thus, the core dialog manager 360 may generate candidate actions corresponding to a specific intent associated with a specific application, or the candidate actions may correspond to a specific application regardless of intent. To illustrate an example of the candidate actions including specific intents, the core dialog manager 360 may generate Dispatch(Skill B: GetCabIntent), Dispatch(Skill B: ViewNearbyCabsIntent), Dispatch(Skill A: GetCabIntent), Dispatch(Skill A: ViewNearbyCabsIntent), etc. and selecting a single action indicates both the application (e.g., Skill A or Skill B) and the intent (e.g., GetCabIntent or ViewNearbyCabsIntent). Thus, selecting the candidate action corresponds to selecting an intent associated with a specific application, which may assist the core dialog manager 360 in selecting between different applications. Additionally or alternatively, the core dialog manager 360 may generate candidate actions based on available applications, regardless of intent. For example, the core dialog manager 360 may generate Dispatch(Skill A), Dispatch(Skill B), etc. and selecting a single action indicates the application to which to dispatch the dialog state data 345. Thus, selecting the candidate action corresponds to sending the dialog state data 345 to the specific application (e.g., Skill B) and the application determines the intent. Additionally or alternatively, the core dialog manager 360 may generate candidate actions based on the application probabilities determined by skill shortlister component 341 and included in dialog state data 345.

In some examples, the core dialog manager 360 may determine that the dialog state data 345 does not include enough information to select an action and generate a dispatch command to dispatch the selected action and/or dialog state to a corresponding application. Instead, the core dialog manager 360 may determine that additional information is needed from the user and may generate a dialog request to solicit the user for the additional information. For example, if the core dialog manager 360 determines one or more intents/actions that may correspond to the speech, but none of the intents/actions are associated with a confidence value meeting or exceeding a threshold value, the core dialog manager 360 may generate a dialog request that requests additional information. While the core dialog manager 360 may dispatch an action despite the confidence score being below the threshold value, a lower confidence score corresponds to an increased likelihood that the selected action is not what the user intended. Thus, dispatching the action may result in performing a command that is different than the user requested, resulting in a lower user satisfaction value after the command is executed.

In order to increase the likelihood that the action selected by the core dialog manager 360 corresponds to the user request, the core dialog manager 360 may generate a dialog request requesting additional information and/or clarification from the user. For example, in response to a request to "book a flight to Portland," the core dialog manager 360 may generate a dialog request and the computing device(s) 120 may solicit the user as to whether Portland corresponds to Portland, Oregon or Portland, Maine (e.g., "Would you like to fly to Portland, Oregon, or to Portland, Maine?"). For example, the action data 365 may include the dialog request and the dialog execution engine 370 may interpret the action data 365 to generate a prompt corresponding to the solicitation. As discussed above, the solicitation may take the form of text output via a display of a user device or audio output by a speaker of a user device. In addition, the solicitation may be output by a device different from the device that received the speech. For example, the first device 110*a* may generate the input audio data but the second device 110*b* may output the solicitation to the user. Accordingly, if the solicitation to the user is to be audio, the TTS component 280 may generate output audio data based on the text data of the prompt and the second device 110*b* may output audio corresponding to the output audio data.

While FIG. 2 illustrates specific routing between components, this is intended to illustrate a single example and the disclosure is not limited thereto. For example, FIG. 2 illustrates the action data 365 being sent from the core dialog manager 360 to the orchestrator component 230 and from the orchestrator component 230 to the dialog state manager 340, and updated dialog data (including the action data 365) being sent from the dialog state manager 340 to the orchestrator component 230, from the orchestrator component 230 to the dialog execution engine 370, and from the dialog execution engine 370 to the application A 290. However, the disclosure is not limited thereto and the dialog data can be routed to any of the components illustrated in FIG. 2 without departing from the disclosure. Thus, any decision making performed by any component in the system 100 may be performed using information (e.g., dialog state data 345) stored in the dialog state manager 340 without departing from the disclosure.

While FIG. 2 illustrates the core dialog manager 360 as a discrete component configured to make decisions for the system 100, and the example described above illustrates the core dialog manager 360 assisting other components in making decisions, the disclosure is not limited thereto. Instead, the core dialog manager 360 may be completely decentralized and individual components may include machine learning models that enable the component(s) to make decisions and optimize user satisfaction over time (collectively, the machine learning models may correspond to the core dialog manager 360). Thus, the core dialog manager 360 may be illustrated as a single component, as a separate component while also being included within individual components, or only within individual components (e.g., without a separate block receiving [11] dialog data and sending [12] action data) without departing from the disclosure.

Figure 3:
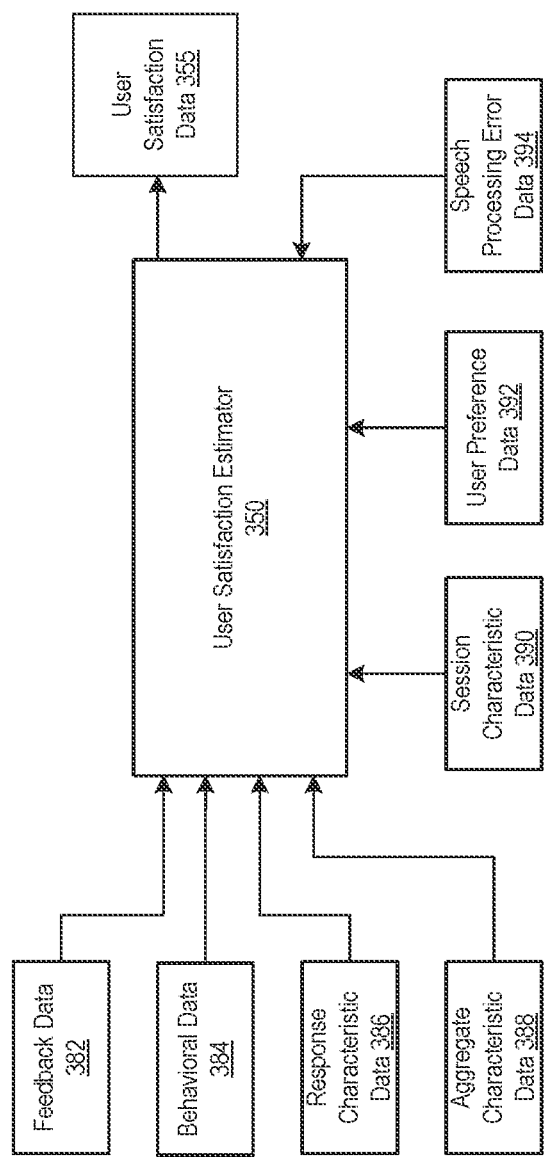
FIG. 3 is a block diagram showing various inputs to a user satisfaction estimator component, in accordance with various embodiments described herein.
Figure 7A:
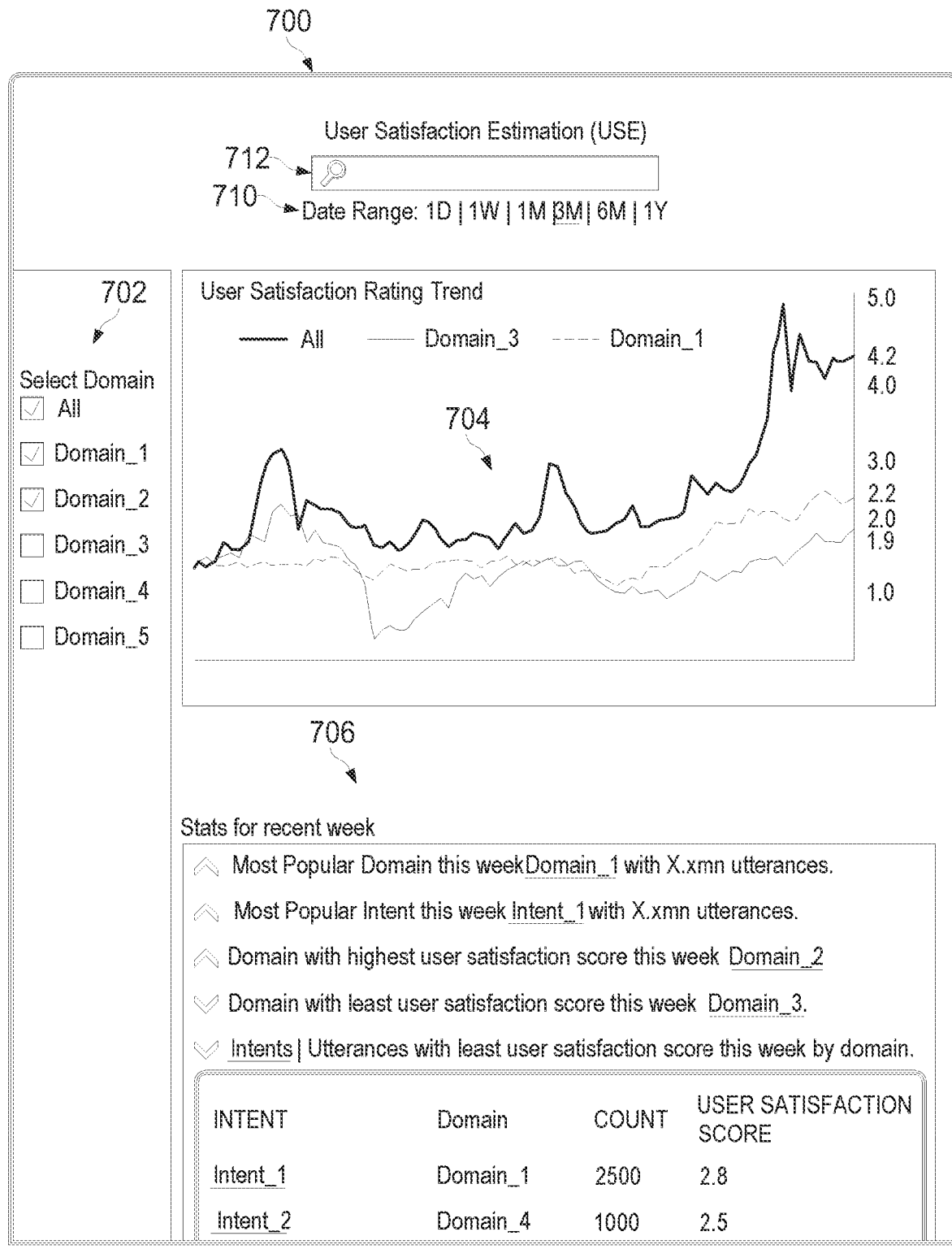
FIG. 7A depicts an example image of a data visualization dashboard that may be used to track user satisfaction data, in accordance with various aspects of the present disclosure.
Figure 7B:
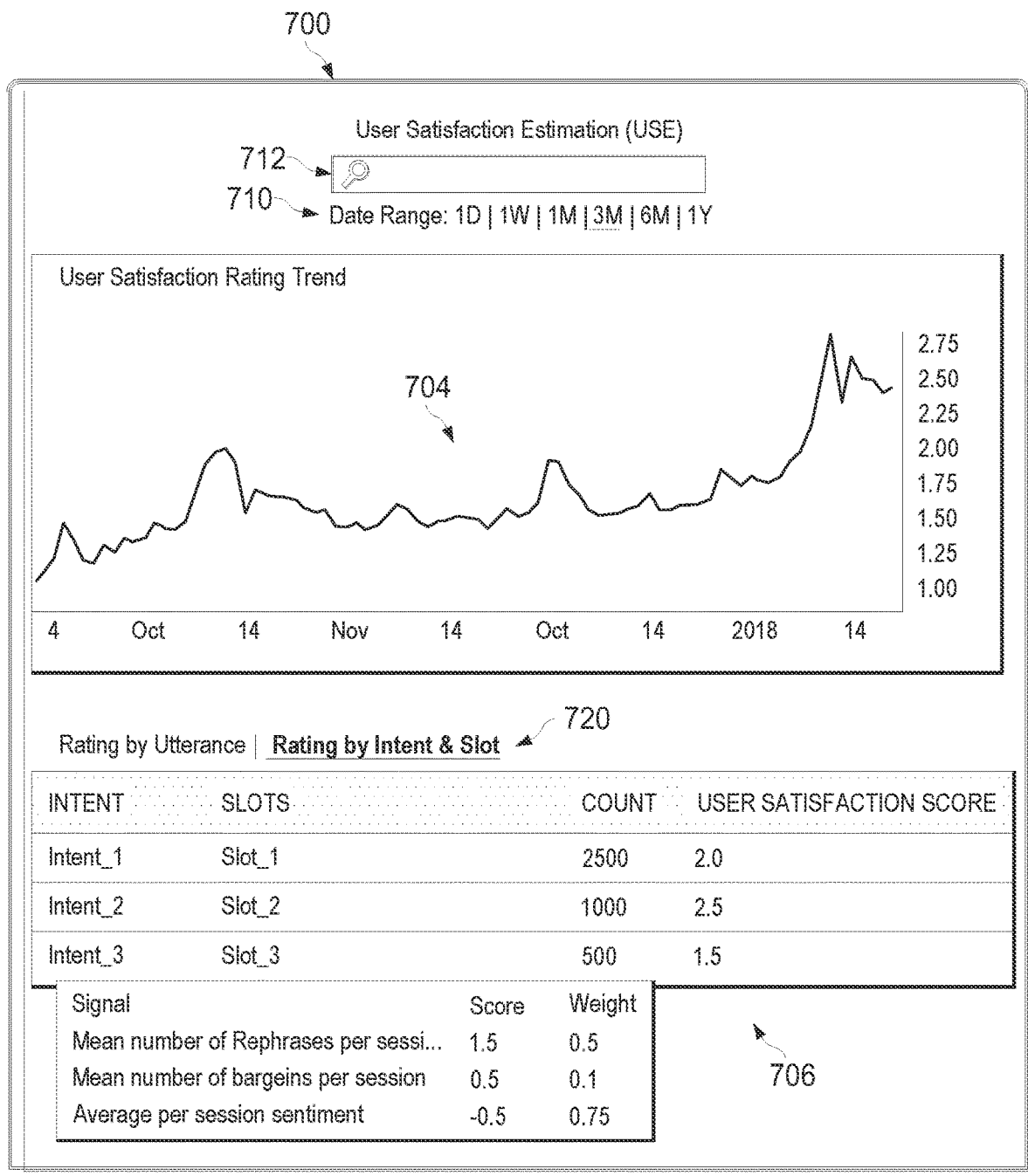
FIG. 7B depicts another example image of a data visualization dashboard that may be used to track user satisfaction data, in accordance with various aspects of the present disclosure.
Figure 7C:
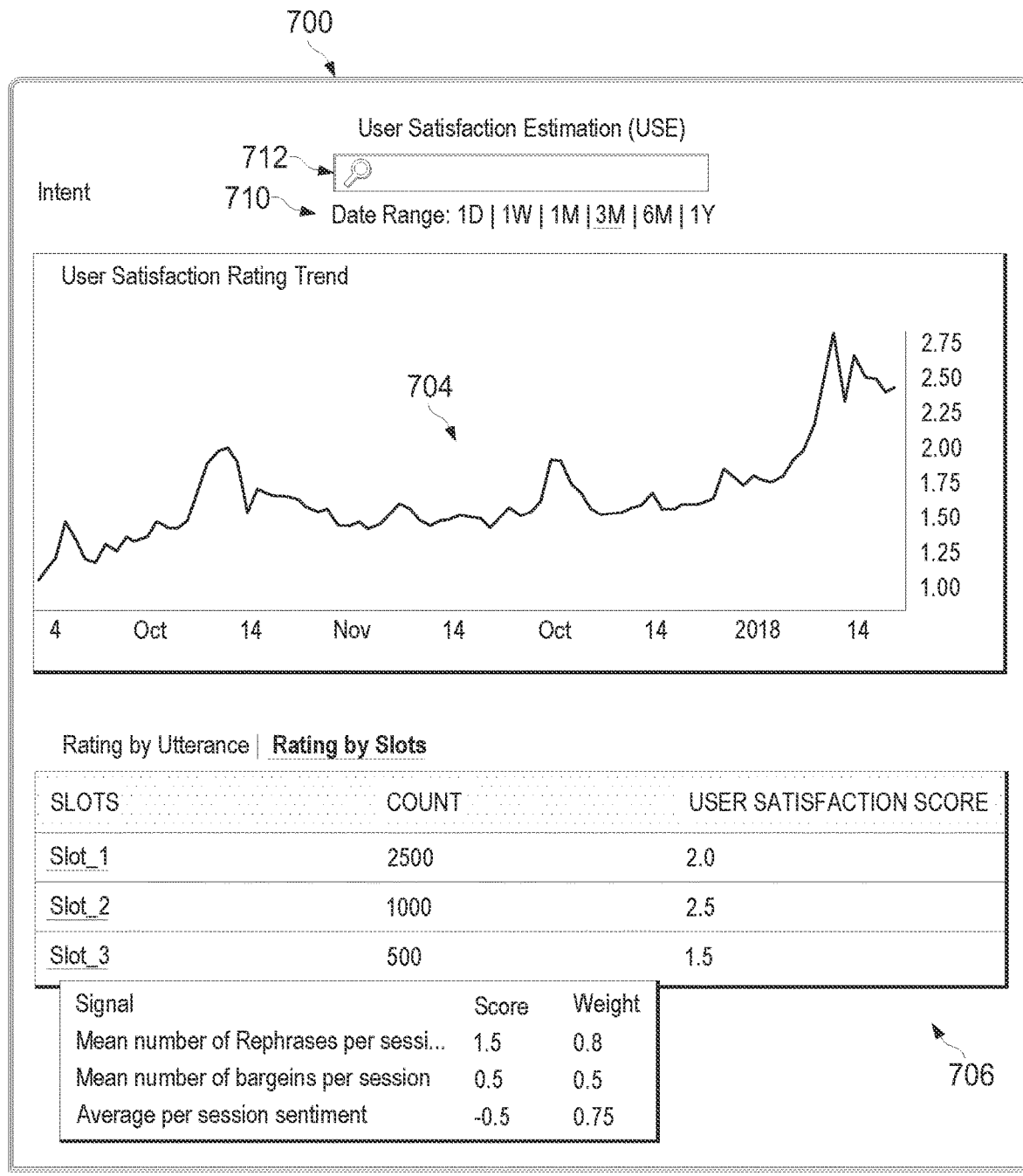
FIG. 7C depicts another example image of a data visualization dashboard that may be used to track user satisfaction data, in accordance with various aspects of the present disclosure.

FIG. 3 is a block diagram showing various inputs to user satisfaction estimator 350, in accordance with various aspects of the present disclosure. In an online, runtime context, user satisfaction estimator 350 may be a machine learning model trained to generate per-turn user satisfaction data 355 that may be used to generate optimal responses to user queries. In various examples, dialog manager 340 may use the per-turn user satisfaction data 355 to train an online dialog policy learning framework to improve system responses to user queries in real time. Additionally, user satisfaction data 355 may be stored over time and may be used in an offline context to optimize application development and/or speech processing capability. FIGS. 7A, 7B, and 7C discuss the offline capability of user satisfaction data 355 in further detail. As used herein, "natural language processing system" may refer to natural language processing capabilities of computing device(s) 110, 120, and/or 125.

As depicted in FIG. 3 a number of feature signals may be used as inputs to user satisfaction estimator 350 to generate user satisfaction data 355. In an example embodiment, user satisfaction data 355 may be a scalar value from 1-5 (e.g., comprising the integers 1, 2, 3, 4, and 5). In various examples, a user satisfaction value of "1" may represent a "terrible" or "worst" response to the user query by the natural language processing system (e.g., by computing device(s) 120). In other words, the user satisfaction value "1" may represent a lowest quantifiable level of user satisfaction for the particular turn. In further examples, a user satisfaction value of "2" may represent an unacceptable response, but not a terrible response. In other words, a user satisfaction value of "2" may represent higher user satisfaction relative to a user satisfaction value of "1" but lesser user satisfaction than a user satisfaction value of "3". In some further examples, a user satisfaction value of "3" may represent a minimally acceptable response from a user's perspective. In other examples, a user satisfaction value of "4" may represent a response that is better than "minimally acceptable" but less than the best or desired response. In some further examples, a user satisfaction value of "5" may represent an "excellent" response or the best possible response for the particular turn.

Feature input signals (e.g., the inputs 382, 384, 386, 388, 390, 392, and/or 394 to the user satisfaction estimator 350 depicted in FIG. 3) may generally be described as being in one or more of three categories: 1) raw inputs, 2) simple derived inputs, and 3) output of another machine learning model. Raw inputs may comprise those inputs that are directly provided by another component and/or system to user satisfaction estimator 350. Examples of raw inputs may include output of speech recognition component 250 (e.g., N-best recognitions data 310), output of natural language understanding component 260 (e.g., N-best intents data 315, including slots and/or intents), audio input, a time at which an utterance was recorded, barge-in data (e.g., data related to detection of a wake word while the natural language processing system is outputting audio data in response to a previous utterance), data representing a natural language processing response to an utterance (e.g., text data or executable commands), data indicating a time since a last use of the natural language processing system, data indicating explicit user feedback (e.g., user feedback data) from a companion application to the natural language processing system (e.g., a user rating of a particular response and/or user comments about a particular response), data indicating a number of unique accounts associated with a given utterance, intent, and/or slot, etc. The list of raw inputs is not exhaustive and other raw input data may be used in accordance with various aspects of the present invention.

Examples of derived inputs may include data indicating a length of natural language processing response and/or user utterance, data indicating a running barge-in count, data indicating diversity of intents data, data indicating the number of turns in a particular dialog with the natural language processing system, data indicating utterance rephrasing (e.g., rephrasing data indicating that the user utterance corresponds to a rephrasing of a previous user input and/or utterance), data identifying similar intents and/or slots to intents and/or slots of a user input, data indicating user preferences computed by ranking most used domain, intents, and/or slots for a given account holder, data indicating aggregate popularity of intents, domains, slots, and/or utterances computed from historical data across one or more accounts, etc. The list of derived inputs is not exhaustive and other derived input data may be used in accordance with various aspects of the present invention.

Examples of inputs computed using machine learning models may include text-based and audio-based sentiment computed using various machine learning models (e.g., deep neural net (DNN) models that capture sentence level abstraction and word order dependency), logistic regression models to determine estimated turn-by-turn error data, and/or a language model (e.g., using sequencing models such as long short term memory (LSTM) models) to predict the probability of error in text output by speech recognition component 250.

The feature input signal 382 may comprise "Feedback data 382" including explicit user feedback such as user ratings and/or textual feedback provided through a companion application of the natural language processing systems described herein. Additionally, feedback data 382 may include captured user sentiment data. Sentiment data may comprise positive, negative, and neutral feedback captured in user text and audio. Sentiment data may include expressed frustration or satisfaction using polarized language (e.g., positive or negative expression). For example, if the user says "Computer, you are awesome!", sentiment data may reflect user satisfaction based on the conversation that the user is having with the natural language processing system. Sentiment data may be captured during run-time as input audio or text or from the companion application. In various examples, sentiment data may be identified by comparing input data to known sentiment data (e.g., stored in a table or other data structure).

In general, behavioral data may represent one or more characteristics of user input data (e.g., a user utterance, user input text, user input video, etc.). In at least some examples, behavioral data and/or user feedback data may indicate user sentiment regarding the user's interaction with the natural language processing system. In various examples, user sentiment may be determined from input audio, input video, and/or input text. In various examples, the feature input signal 384 may comprise "Behavioral data 384", which may include indications of aspects of the user behavior with respect to the natural language processing system. For example, behavioral data 384 may include utterance rephrasing data. Utterance rephrasing data may capture similarities between consecutive user utterances spoken by a user during a dialog. Accordingly, utterance rephrasing captures examples where users rephrase a particular utterance when the natural language processing system does not understand the instruction correctly the first time. For example, a user may request "Play some 90's music." The natural language processing system may respond with, "Ok, playing some music by the artist Nighties". The user may thereafter rephrase the utterance. Accordingly, utterance rephrasing data may be sent to user satisfaction estimator 350.

In some examples, the feature input signal "Behavioral data 384" may further include intent and slot repetition data. Similar to utterance rephrasing data, intent and slot repetition data may capture the repetition of intents (with associated slots) such as when the natural language processing system does not interpret the instruction correctly the first time.

In various examples, the feature input signal "Behavioral data 384" may further include barge-in data. Barge-in data may capture instances when the natural language processing system detects a wake word while the natural language processing system is outputting audio or video in response to previous user input data (e.g., the user interrupts or "barges in" with a subsequent command while the natural language processing system is playing music or otherwise responding to the user's previous command).

In some examples, the feature input signal "Behavioral data 384" may further include termination data. Termination data may capture instances when the user instructs the natural language processing system to stop what the natural language processing system is currently doing. For example, the natural language processing system may be playing a song and the user may state "Computer, stop!".

In some examples, the feature input signal "Behavioral data 384" may further include user question data. User question data may capture scenarios in which the user inquires why the natural language processing system has responded in a certain way or has taken a particular action. For example, a user may inquire "Computer, why did you say that?".

In some examples, the feature input signal "Behavioral data 384" may further include confirmation and negation data. Confirmation data may capture scenarios when the user confirms a suggestion from the natural language processing system. For example, the natural language processing system may suggest a particular song and the user may say "yes" or "of course" or some other confirmation utterance. Similarly, negation data captures scenarios where the user negates or responds negatively to a suggestion (e.g., "no", "negative").

In some examples, the feature input signal "Behavioral data 384" may further include duration data that may capture a time difference between consecutive utterances. Additionally, behavioral data 384 may include length of utterance data that may indicate the length of time that a user utterance lasts. Behavioral data 384 may include filler word data. Filler word data may indicate the presence of filler words (e.g., "umm", "ahh", "well", etc.) in user utterances.

In some examples, the feature input signal 386 may comprise "Response Characteristic Data 386" including coherence data indicating a degree of coherence between a response of the natural language processing system and the user utterance for the same turn. In an example, if a response of the natural language processing system and the user utterance are related to the same question an indication of coherence for the turn may be sent to user satisfaction estimator 350.

In still other examples, the feature input signal "Response Characteristic Data 386" may further include response length data. Response length data may capture a length of the response of the natural language processing system to a user utterance or user request.

In various examples, the feature input signal "Response Characteristic Data 386" may further include apology data. Apology data capture instances in which the natural language processing system apologizes. For example, if the user requests an answer to a question and the natural language processing system responds "I am sorry; I don't know the answer to that question." Apology data may be generated and sent as a portion of the feature signal Response Characteristic Data 386 to user satisfaction estimator 350.

In some examples, the feature input signal "Response Characteristic Data 386" may further include affirmation and/or negation data. Affirmation data may include natural language processing system responses such as "Yes", "Absolutely", "Sure", etc. Conversely, negation data may include natural language processing system responses such as "No", "I don't know", "I don't understand", etc.

In some examples, the feature input signal "Response Characteristic Data 386" may further include filler word data. Filler word data may indicate the presence of filler words (e.g., "umm", "ahh", "well", etc.) in natural language processing system responses.

In various examples, the feature input signal "Response Characteristic Data 386" may further include confirmation request data. Confirmation request data may indicate scenarios in which the natural language processing system seeks to confirm a user choice and/or instruction. For example, the user may request a Song A. The natural language processing system may be unable to locate Song A and may ask "Did you mean Song B?". An indication of such a confirmation request may be represented by Response Characteristic Data 386.

The feature input signal 388 may comprise "Aggregate Characteristic Data 388" including utterance, intent, and/or slot frequency data. Utterance frequency data may indicate the frequency of a particular utterance for a particular user or among multiple users. Similarly, intent frequency data may indicate the frequency of a particular intent determined for a single user and/or for multiple users. Slot frequency data may indicate the frequency of slots invoked by a particular user or among multiple users. The feature input signal "Aggregate Characteristic Data 388" may further include data comprising a ratio of utterance frequency to the number of unique users. In some further examples, the feature input signal "Aggregate Characteristic Data 388" may include data indicating a popularity (e.g., a score) of an utterance, intent, and/or slot over one or more users and/or over a particular time period.

In at least some examples, the feature input signal 390 may comprise "Session Characteristic Data 390" including dialog length data, which may comprise the current number of turns in a dialog session between a user and the natural language processing system. In some examples, for a third party application or skill, a dialog session may commence upon a user invoking the third party application or skill and may commence upon the session with the third party application being terminated (e.g., through user termination or through a session timeout). In some other examples, for a first party application or skill, a dialog session may commence upon a user initiating a dialog with the natural language processing system (e.g., by uttering a wake word followed by user input). In the context of a first party application and/or skill, the dialog session may terminate after a pre-defined amount of time (e.g., after 45 seconds, or some other amount of time, have elapsed since the commencement of the dialog session). In some further examples, session characteristic data 390 may comprise data indicating a total number of times a barge-in occurs during a dialog session. In various other examples, session characteristic data 390 may comprise intent diversity data for a dialog session. Intent diversity data may comprise the percentage of distinct intents invoked in a dialog session relative to the total number of intents invoked during a dialog session. For example, if during a particular dialog session, a user invokes three separate instances of the same intent, the intent diversity data may reflect that ⅓ of the intents were distinct. In various examples, intent diversity data may indicate whether or not a user was satisfied with a particular interaction. In various examples, determining whether a user is satisfied with their interactions with a natural language processing system may be more difficult relative to determining that the user is frustrated. When a user receives a satisfactory response, the user may take one of a diverse set of actions such as—leave the conversation, continue the dialog, leave explicit positive feedback, etc. Intent diversity data is the percentage of distinct intents in a dialog session. Accordingly, in some examples, higher intent diversity during a dialog session may indicate that the user is satisfied. For example, a user continuing dialog in a given dialog session and covering a plurality of different intents within the dialog session may positively correlate with high user satisfaction.

In various further examples, the feature input signal 392 may comprise "User Preference Data 392" including data representing average dialog session length for a given user, intent and slot data (e.g., popularity) for a given user in a given domain. In some further examples, user preference data 392 may include data representing the amount of time a user has been actively using the natural language processing system (e.g., using a particular domain and/or skill), etc. In some further examples, user preference data 392 may include an indication of the average number of turns per dialog session for a particular user. In various further examples, user preference data 392 may further include the average number of turns for a particular domain and/or skill for a user. In general, user preference data 392 may correlate dialog session length and/or number of turns per dialog session to particular users. As a result, in some examples, users that tend to have shorter dialog sessions and/or fewer turns per dialog sessions are not necessarily assumed to be unsatisfied with their interactions with a natural language processing system based on the relative brevity of their interactions therewith. Similarly, a user associated with user preference data 392 that indicates that the user tends to have longer dialog sessions with the natural language processing system may not necessarily be deemed to be satisfied with their interactions with the natural language processing system responses based on the relative lengthiness of their interactions therewith. In various examples, some of user preference data 392 may be provided by personal graph service 330 as personal graph data 356.

In various further examples, the feature input signal 394 may comprise "Speech Processing Error Data 394" including a speech recognition output confidence score (e.g., provided by speech recognition component 250), a natural language output confidence score (e.g., provided by natural language understanding component 260), response-error data, turn-by-turn error data, NLU error probability (e.g., the probability of an error by natural language understanding component 260), speech recognition error probability (e.g., the probability of an error in output text from speech recognition component 250), etc. In various examples, response-error data may indicate that the natural language processing system was unable to process a particular user input. Natural language processing system responses to determine if there was an error in the response. Turn-by-turn error data may use a machine learning model to predict if there is a system error in natural language processing components.

Based on the feature input signals 382, 384, 386, 388, 390, 392, and/or 394 user satisfaction estimator 350 may use one or more machine learning models to output user satisfaction data 355. In various examples, a combination of supervised and unsupervised machine learning models may be used to combine the feature input signals 382, 384, 386, 388, 390, 392, and/or 394 in order to generate user satisfaction data 355 (e.g., a composite user satisfaction score from 1-5). Various machine learning models may include linear regression and non-linear regression models to predict the user satisfaction data 355 on a continuous scale. Deep Neural Net (DNN) models may be used for text to feature transformation. Classification models such as Support Vector Machines, DNNs, Decision Trees (and variants), Max Entropy, etc. for predicting categorical output. Additionally, unsupervised models such as HMMs, and clustering techniques may be used in some examples to generate user satisfaction data 355.

Training data may include various dialog data labeled using a particular user satisfaction score (e.g., 1-5, or another score depending on the particular implementation). Training data may be used to train the various machine learning models of user satisfaction estimator 350 such that user satisfaction estimator 350 generates the known user satisfaction score associated with a given set of features.

In various examples, the following data may positively correlate with low user satisfaction scores (e.g., weight ≤0.05): presence of apology and negation in natural language processing system response, high prior probability of intent and/or slot recognition error by natural language understanding component 260, barge-ins, empty (null) response to user request by natural language processing system, user termination of a session, similarity between consecutive user utterances, number of barge-ins in a current session, negative sentiment in user utterance, natural language processing system asking a question, intent and slot repetition in user utterance. The aforementioned data are by way of examples only and are not determinative of user satisfaction data 355 generated by user satisfaction estimator 350. In addition, the data and feature signals described herein are not exhaustive and other types of data and/or feature signals may be used to generate user satisfaction data 355 by user satisfaction estimator 350.

In various further examples, the following data may positively correlate with high user satisfaction scores (e.g., weight ≥0.05): low probability of speech recognition error, longer dialog length, high intent diversity, coherence between user utterance and natural language processing system response, longer user utterances, user continuing after saying "stop", user asking a question, utterance rephrasing, natural language processing system providing affirmative response. The aforementioned data are by way of examples only and are not determinative of user satisfaction data 355 generated by user satisfaction estimator 350. In addition, the data and feature signals described herein are not exhaustive and other types of data and/or feature signals may be used to generate user satisfaction data 355 by user satisfaction estimator 350.

In various examples, stop intents (e.g., "Computer, stop"), intents that address the natural language processing system as an entity (e.g., "Computer, I love you" and "Computer, you are awful"), barge-ins, repetitions, and user expression of preference intents may be among the most common of the feature signals described above. In various examples, the informativeness of the various feature signals described above may be measured using various proxies. Examples of proxies include goal success rate (GSR), turn-by-turn error data, and/or sentiment analysis. GSR may measure the success or failure of a dialog based on the goal the user is attempting to achieve. Using GSR as a proxy is based on the assumption that a user becomes frustrated when the user's goal is not met. Turn-by-turn error data is a logistic regression based model that predicts the GSR annotation output in an automated fashion. Sentiment analysis determines user sentiment based on polarized utterances/text. Presence of sentiment is an explicit signal indicating user happiness or dis-satisfaction.

In various examples, the prevalence of the various feature signals discussed above is determined. For example, a stop intent may be present in 9.0% of total instances and a barge-in may be present in 1.483% of total instances. In various examples, the different feature signals may be GSR annotated meaning that there is explicit information denoting whether or not the user goal was satisfied in the signal. However, if no GSR annotation exists, turn-by-turn error data may be used to predict GSR annotation. Sentiment of signals may be determined using polarized text within the signals. The informativeness of the various signals may be determined using the GSR annotation, turn-by-turn error data and sentiment of the various feature signals. Informativeness may be determined by calculating the percentage of matched utterances for each signal that indicate failure and/or sentiment for each proxy (e.g., GSR, turn-by-turn error data, and sentiment analysis). In various examples, barge-ins may be the most informative signal indicating a failure based on combined turn-by-turn error data, and GSR scores. A cancel intent may be the most informative signal based on GSR annotation. An intent that relates to expression of a user preference may be the most informative signal based on turn-by-turn error data. Intents that address the natural language processing system as an entity may be the most informative based on sentiment analysis. The informativeness of the various signals may be used to weight the signals to generate user satisfaction data 355.

Figure 4:
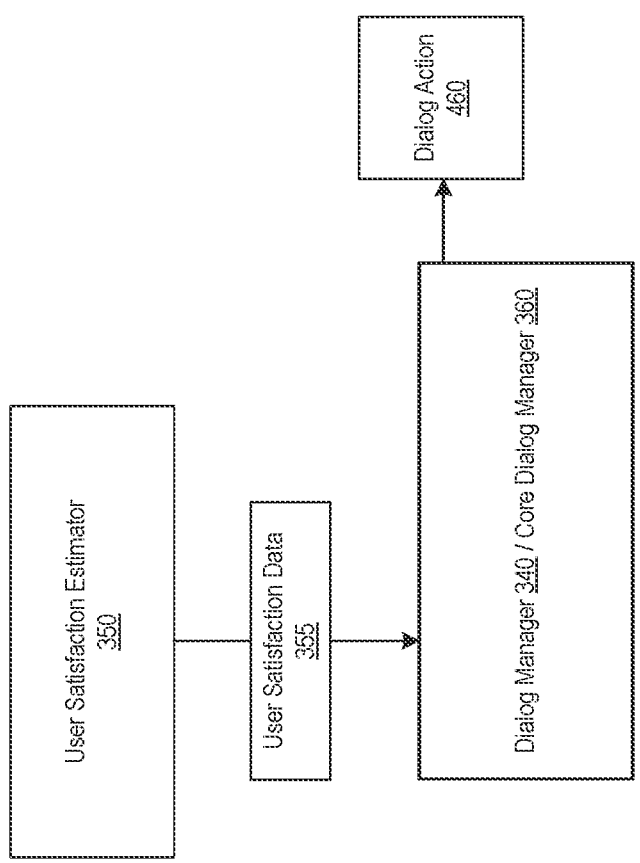
FIG. 4 is a block diagram showing a user satisfaction estimator in communication with a dialog manager and/or a core dialog manager, in accordance with various embodiments of the present disclosure.

FIG. 4 is a block diagram showing a user satisfaction estimator in communication with dialog manager 340 and/or core dialog manager 360 in accordance with various aspects of the present disclosure. As previously described, user satisfaction estimator 350 may send user satisfaction data 355 to dialog manager 340 (e.g., through orchestrator component 230) on a per-turn basis. In various examples, dialog manager 340 may update dialog state data 345 with the user satisfaction data 355. Thereafter, dialog manager 340 and/or core dialog manager 360 may determine an action to perform from among candidate actions based at least in part on the user satisfaction data 355. For example, the natural language processing system may associate a first user satisfaction value with a first state, select an action and/or execute a command and associate a second user satisfaction value with a second state. By comparing the first user satisfaction value to the second user satisfaction value, the system 100 may determine whether the selected action and/or command increased or decreased user satisfaction and by how much. Thus, when tracking user satisfaction values over a long period of time, the system 100 may optimize machine learning models (e.g., trained models) to select actions and/or commands that maximize user satisfaction values. Dialog manager 340 and/or core dialog manager 360 may use rule-based and/or stochastic models to optimize actions taken by the natural language processing system. In various examples, a rule-based approach may use a per-turn user satisfaction score to determine the relevant response to a user query. In various other examples, the user satisfaction data may be a "reward" signal used to choose the best action for each turn. Finally, in some examples, the user satisfaction data may be used by a stochastic dialog manager that takes the user satisfaction data 355 as a reward signal to train an online Dialog Policy Learning framework for optimizing future responses to user input. In the example depicted in FIG. 4, dialog manager 340 and/or core dialog manager 360 may use user satisfaction data 355 to determine a dialog action 460. Dialog action 460 may be for example the launching of a skill, posing a clarifying question based on a user utterance, confirming an action with the user, displaying information to the user, playing audio for the user, etc.

Figure 5:
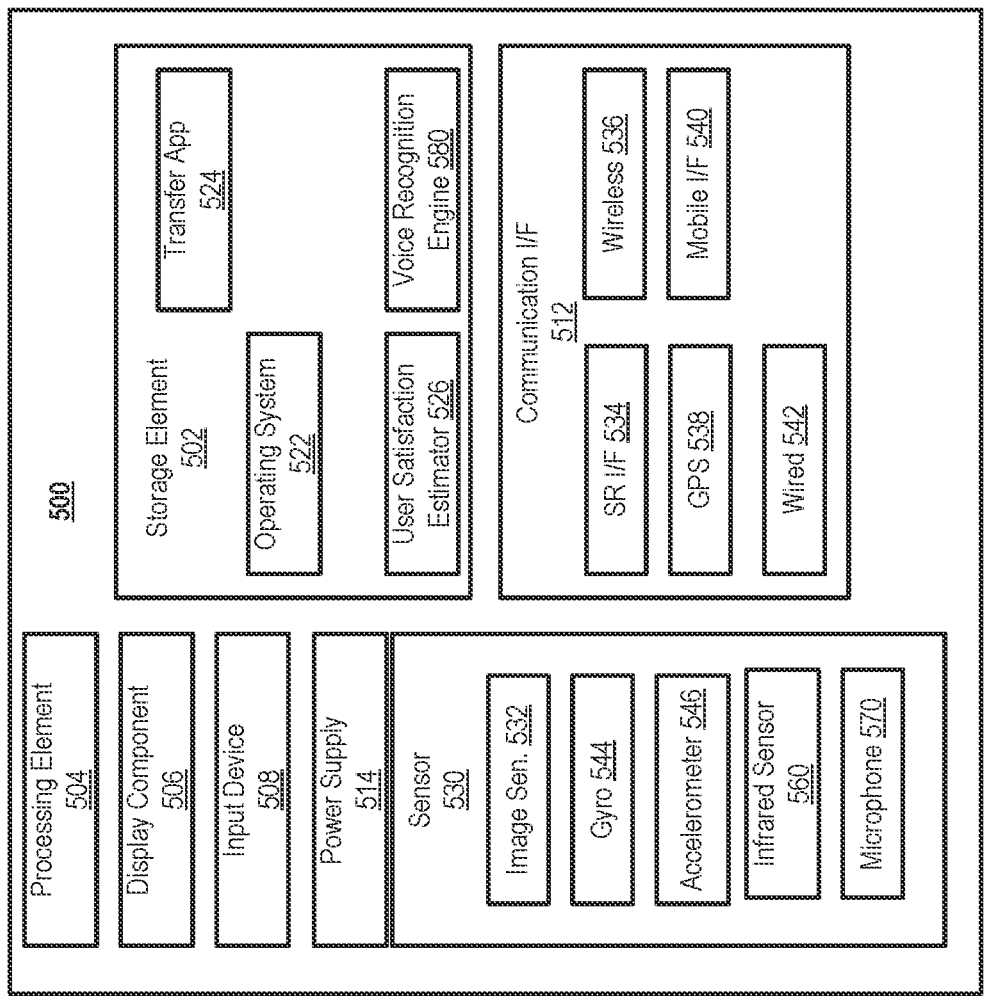
FIG. 5 is a block diagram conceptually illustrating an example architecture of a computing device that may be used in accordance with various techniques described herein.

FIG. 5 is a block diagram showing an example architecture 500 of a computing device, such as device 110*a*, 110*b*, computing device(s) 120, 125, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to generate user satisfaction data, as described above in reference to FIG. 3. The storage element 502 can include one or more different types of non-transitory computer-readable memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice commands to one or more voice recognition servers (e.g., computing device(s) 120).

In some examples, storage element 502 may include a user satisfaction estimator 526. The user satisfaction estimator 526 may be effective to generate user satisfaction data (e.g., user satisfaction data 355). The user satisfaction data 355 may be used to optimize current responses to user input and/or may be stored to generate offline user satisfaction data that may be used to improve skills and/or to track performance of skills over time.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice commands. Voice recognition engine 580 may interpret audio signals of sound captured by microphone 570. In some examples, voice recognition engine 580 may listen for a "wake-word" to be received by microphone 570. Upon receipt of the wake-word, voice recognition engine 580 may stream audio to a voice recognition server for analysis, as described above in reference to FIG. 2. In various examples, voice recognition engine 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

Motion sensors may include any sensors that sense motion of the architecture including, for example, gyro sensors 544 and accelerometers 546. Motion sensors, in some examples, may be used to determine an orientation, such as a pitch angle and/or a roll angle, of a device. The gyro sensor 544 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 546 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 538 may be utilized as a motion sensor. For example, changes in the position of the architecture 500, as determined by the GPS interface 538, may indicate the motion of the GPS interface 538. Infrared sensor 560 may be effective to determine a distance between a surface and the device including the infrared sensor 560. In some examples, the infrared sensor 560 may determine the contours of the surface and may be capable of using computer vision techniques to recognize facial patterns or other markers within the field of view of the infrared sensor 560's camera. In some examples, the infrared sensor 560 may include an infrared projector and camera. Processing element 504 may build a depth map based on detection by the infrared camera of a pattern of structured light displayed on a surface by the infrared projector. In some other examples, the infrared sensor 560 may include a time of flight camera that may compute distance based on the speed of light by measuring the time of flight of a light signal between a camera of the infrared sensor 560 and a surface. Further, in some examples, processing element 504 may be effective to determine the location of various objects in the physical environment within the field of view of a device based on the depth map created by the infrared sensor 560. As noted above, in some examples, non-infrared depth sensors, such as passive stereo camera pairs, or non-identical camera pairs, may be used in device in place of, or in addition to, infrared sensor 560. Processing element 504 may be effective to determine the location of various objects in the physical environment within the field of view of a camera of architecture 500 based on the depth map created by one or more non-infrared depth sensors.

Figure 6:
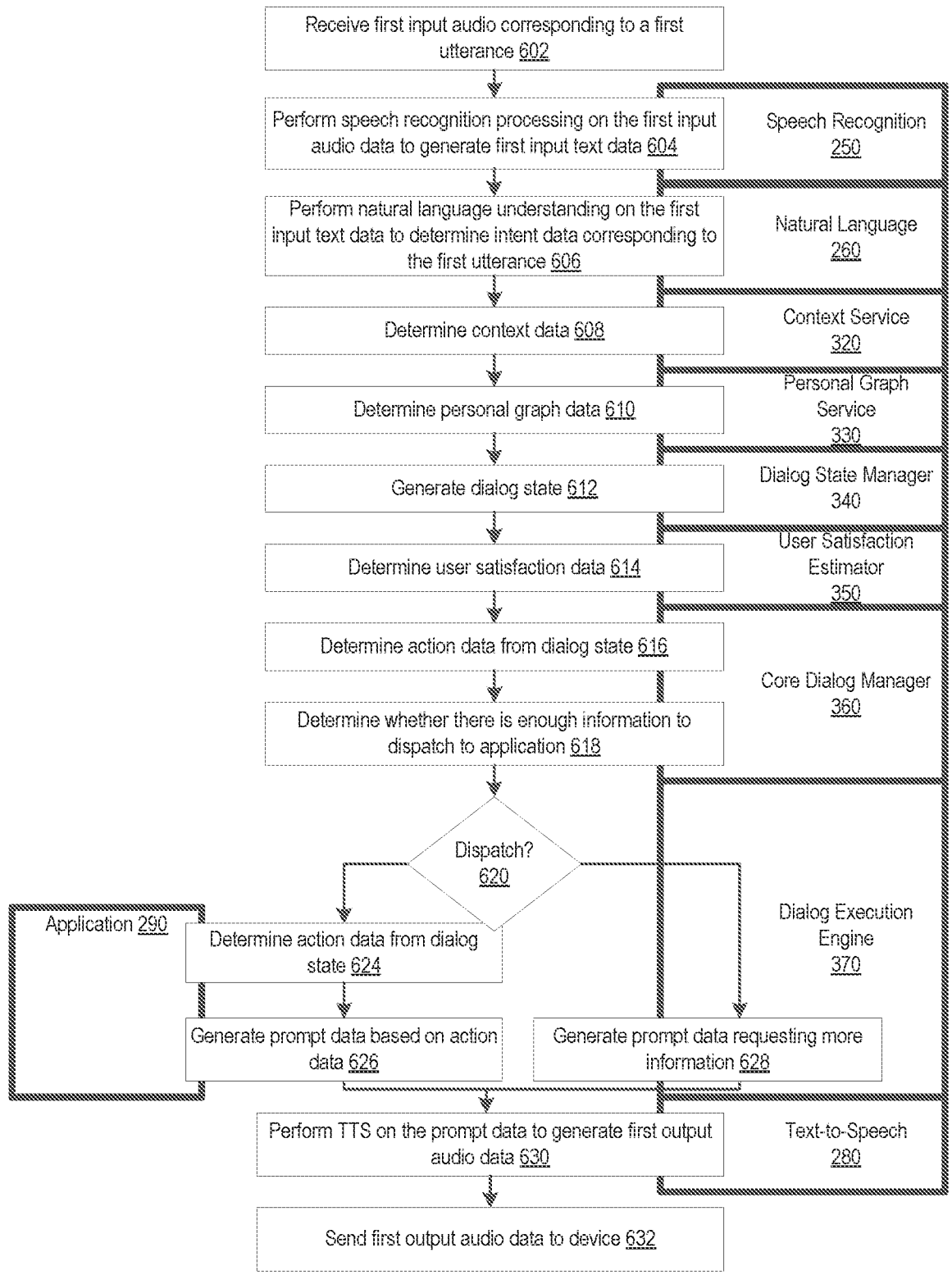
FIG. 6 is a flow chart illustrating an example method of processing speech to determine an action according to various embodiments of the present disclosure.

FIG. 6 is a flowchart illustrating an example method of processing speech to determine an action according to embodiments of the present disclosure. As illustrated in FIG. 6, the computing device(s) 120 may receive (602) first input audio corresponding to a first utterance and perform (604) speech language recognition processing on the first input audio data to generate first input text data, which may be performed by the speech recognition component 250. The computing device(s) 120 may then perform (606) natural language understanding on the first input text data to determine intent data corresponding to the first utterance, which may be performed using the natural language understanding component 260. The computing device(s) 120 may determine (608) context data, which may be performed by the context service component 320, and determine (610) personal graph data, which may be performed by the personal graph service component 330.

The computing device(s) 120 may generate (612) a dialog state, which may be performed by the dialog state manager 340. For example, the dialog state manager 340 may receive the information from the speech recognition component 250, the natural language understanding component 260, the context service component 320, and/or the personal graph service component 330 and may generate the dialog state representing a current state of the dialog (e.g., conversation exchange) between the system 100 and the user 5.

The computing device(s) 120 may determine (614) a user satisfaction value (e.g., user satisfaction data 355), which may be performed by the user satisfaction estimator 350. For example, the user satisfaction estimator 350 may receive the dialog state from the dialog state manager 340 and may determine a scalar value between 1 and 5 that approximates a current satisfaction of the user, as described herein in reference to FIGS. 3 and 4. In at least some examples, user satisfaction data 355 may be determined based on prior turns and/or prior dialog sessions. For example, user satisfaction data 355 may be determined based on one or more of feedback data 382, behavioral data 384, response characteristic data 386, aggregate characteristic data 388, session characteristic data 390, user preference data 392, and/or speech processing error data 394 from a previous turn and/or a previous dialog session. In another example, user satisfaction data 355 may be determined based on one or more of feedback data 382, behavioral data 384, response characteristic data 386, aggregate characteristic data 388, session characteristic data 390, user preference data 392, and/or speech processing error data 394 from a previous turn and/or dialog session and further based on behavioral data 384 from a current turn (e.g., based on the most recent user input). In such an example, user satisfaction data 355 may be used during run time to determine a response to the most recent user input. As previously described, user satisfaction data 355 may also be stored and may be accessible through a data visualization dashboard, as described below in FIGS. 7A, 7B, and 7C.

The computing device(s) 120 may determine (616) action data from the dialog state and may determine (618) if there is enough information to dispatch the dialog state to an application, which may be performed by the core dialog manager 360. For example, the core dialog manager 360 may perform rule-based and machine-learning based steps to identify a selected action.

The computing device(s) 120 may determine (620) whether to dispatch the dialog state to an application or to prompt the user for additional information, which may be performed by the dialog execution engine 370. If the computing device(s) 120 determine not to dispatch the dialog state to the application, the computing device(s) 120 may generate (628) prompt data requesting more information, which may be performed by the dialog execution engine 370. The prompt data may solicit the user to provide additional information with which the computing device(s) 120 may more accurately determine the command requested by the user. For example, the prompt data may correspond to a prompt of "Would you like to fly to Portland, Oregon, or to Portland, Maine."

If the computing device(s) 120 determine to dispatch the dialog state to an application, the computing device(s) 120 may send the dialog state to a selected application 290 corresponding to the selected action indicated in the action data. The computing device(s) 120 may determine (624) action data from the dialog state may generate (626) prompt data based on the action data. For example, a dialog manager specific to the application 290 may determine the action data (e.g., selected action, and a dialog execution engine specific to the application 290 may generate the prompt data.

The computing device(s) 120 may perform (630) text-to-speech (TTS) on the prompt data to generate first output audio data, which may be performed by the text-to-speech component 280, and may send (632) the first audio data to a device 110 to output audio to the user.

As discussed above, the computing device(s) 120 may determine whether to dispatch the dialog state to the selected application or to request additional information from the user to clarify the requested command. While requesting additional information improves the speech recognition confidence score associated with an action and increases a likelihood that the computing device(s) 120 accurately executes the command requested by the user, soliciting additional information delays execution of the command and requires additional attention from the user, which may decrease a user satisfaction score.

In determining whether to dispatch the dialog state or request additional information, the computing device(s) 120 may prioritize increasing user satisfaction with every decision. For example, the computing device(s) 120 may determine that not requesting additional information corresponds to a higher user satisfaction value (e.g., 5) whereas requesting additional information corresponds to a lower user satisfaction value (e.g., 3) and may determine not to request the additional information. However, while this maximizes the user satisfaction during a particular moment in time, this may not maximize overall user satisfaction, particularly when the computing device(s) 120 executes a command that the user did not request.

To illustrate an example, the computing device(s) 120 may receive a request to "book a reservation for 5 people" but may incorrectly process the request as a command to "book a reservation for 50 people." While requesting additional information and/or clarification would slightly reduce user satisfaction at the moment that the user had to provide the additional information, not requesting the additional information and executing the command to make a reservation for 50 people would drastically reduce user satisfaction at the moment that the user arrived for the reservation.

FIG. 7A depicts an example image of a data visualization dashboard 700 that may be used to track user satisfaction data, in accordance with various aspects of the present disclosure. Data visualization dashboard 700 may be a graphical user interface. In various examples, data visualization dashboard 700 may be displayed in a browser and/or through a software application executing on one or more computing devices. User satisfaction estimation data 355 generated by user satisfaction estimator 350 may be stored over time and may be used to visualize trends through an offline system (e.g., a browser-based system). User satisfaction estimation data 355 may be stored in association with feature data, user input data (e.g., ASR text and/or input text), and natural language processing response data. User satisfaction estimation data 355 and associated data may be stored in memory (e.g., user profile storage) or in one or more other storage repositories.

Data visualization dashboard 700 may be used to measure the overall performance of first party domains and third party skills from the perspective of end-user satisfaction by displaying statistics and/or one or more visual representations of user satisfaction data 355. Additionally, data visualization dashboard 700 may be used to identify interactions which cause dissatisfaction to users. Data visualization dashboard 700 may allow user satisfaction data 355 trends to be determined at various levels of granularity. For example, data visualization dashboard 700 may display user satisfaction data on a per-domain, per-skill, per-intent and/or per-utterance level. Domain selection tool 702 may allow a user of data visualization dashboard 700 to select a domain of interest from among various natural language processing domains. In various examples, a natural language processing domain may comprise one or more skills that may be perform related functions. For example, a music domain may comprise various different skills related to different music services. In some examples, a particular domain may comprise a single skill. In such cases where the domain includes a single skill, the skill and the domain may be conceptually thought of as the same. In some examples, a skill selection tool similar to domain selection tool 702 may be displayed for domains including multiple skills. In various other examples, similar tools may be provided for various skills, intents, and/or utterances.

Additionally, or alternatively, a search field 712 may be used for selecting particular domains, intents, slots, skills, etc. Date range selection tool 710 may be used to select a particular time period over which to view user satisfaction data 355 for the particular data selected. Trend lines 704 may be depicted over the particular data range in a data visualization region of the data visualization dashboard 700. As depicted in FIG. 7A multiple trend lines may be simultaneously displayed for inter-domain, inter-skill, or other simultaneous comparison. Stats 706 may be displayed for a particular time period and/or for the particular domain, skill, intent, slot, or other selections made.

FIG. 7B depicts another example image of data visualization dashboard 700 that may be used to track user satisfaction data in accordance with various aspects of the present disclosure. FIG. 7B depicts user satisfaction data tracking over a three month period for a selected domain (e.g., Domain_1). Trending intents and slots are shown in the stats 706 in association with their popularity and average user satisfaction scores. As depicted in FIG. 7B, in at least some examples, overall ratings may be selected using selection tool 720 to sort based on utterance, based on intent & slot, or based on any desired data type and/or level of granularity.

FIG. 7C depicts another example image of data visualization dashboard 700 that may be used to track user satisfaction data in accordance with various aspects of the present disclosure. FIG. 7C depicts user satisfaction data tracking over a three month period for a selected intent (e.g., Intent_1). Trending slots are depicted in stats 706 in association with a count and with the associated average user satisfaction score for the slot as used with the selected intent.

Figure 8:
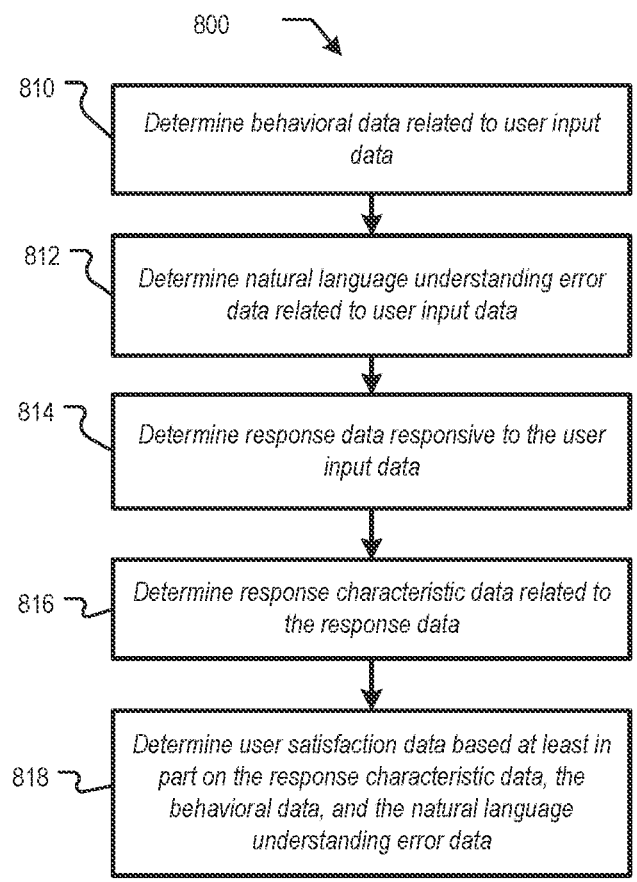
FIG. 8 depicts a flow chart showing an example process for generating a user satisfaction data, in accordance with various aspects of the present disclosure.

FIG. 8 depicts a flow chart showing an example process 800 for determining user satisfaction data for a particular user input and a response to the user input generated by a natural language processing system, in accordance with various aspects of the present disclosure. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. In various examples, the process 800 may be performed in different sequences apart from what is depicted in FIG. 8. For example, action 812 may be performed prior to, or in parallel with, action 810. Additionally, in some examples, certain actions may be removed or added to process 800.

In some examples, the process 800 may begin at action 810. At action 810, "Determine behavioral data related to user input data". At action 810, behavioral data may be determined by the natural language processing system. In various examples, behavioral data may be utterance rephrasing data, intent and slot repetition data, barge-in data, termination data (e.g., where the user instructs the natural language processing system to stop a current playback, response, and/or process), user question data, user confirmation and/or negation data, duration data, utterance length data, filler word data, etc. In general, behavioral data may comprise characteristics of a user utterance and/or of other user input (e.g., text).

In various examples, the process 800 may continue from action 810 to action 812, "Determine natural language understanding error data related to user input data". At action 812, natural language understanding error data related to the user utterance or other input may be determined. In various examples, natural language understanding error data may comprise a speech recognition output confidence score (e.g., a confidence score for text generated by speech recognition component 250), a natural language output confidence score (e.g., a confidence score for semantic data and/or intent data determined by natural language understanding component 260), response-error data describing an error in a natural language processing response to user input, turn-by-turn error data, NLU error probability data, speech recognition error probability data, etc. In general, natural language understanding error data relates to confidence scores and/or probabilities of errors of responses and/or actions generated by the natural language understanding system in response to a particular user utterance or other user input.

In various examples, the process 800 may continue from action 812 to action 814, "Determine response data responsive to the user input data." At action 814, response data for the user input data (e.g., for the utterance or textual input) may be determined. In various examples and as described herein, the natural language processing system may determine response data by performing speech recognition processing on a user utterance to determine input text data. Natural language processing may be performed on the input text data to determine intent and/or slot data corresponding to the user utterance. Context data and/or personal graph data may be determined and used to update dialog state data. Action data may be determined from a current dialog state. In some examples, action data may be dispatched to a skill to generate prompt data. Prompt data may be used by a text to speech (TTS) component to generate output audio data. In various examples, the response data may include the output audio data and/or text data corresponding to the output audio data.

In various examples, the process 800 may continue from action 814 to action 816, "Determine response characteristic data related to the response data." At action 816, response characteristic data may be determined. Response characteristic data may comprise indications of coherence between the user input data and the response data generated in response to the user input data. In some further examples, response characteristic data may comprise an indication of the length of the response data when played back as audio. In various further examples, response characteristic data may comprise an indication of an apology in the response data. In some further examples, response characteristic data may comprise an indication of an affirmation and/or a negation in the response data. In some other examples, response characteristic data may comprise, an indication of filler word data. In yet other examples, response characteristic data may comprise confirmation request data wherein the natural language processing system confirms a user choice and/or instruction. The previous list of response characteristic data is not exhaustive and other types of response characteristic data may be used in place of and/or in addition to the particular examples listed. In general, response characteristic data relates to characteristics of a natural language processing system's response to a user input.

In various examples, the process may continue from action 816 to action 818, "Determine user satisfaction data based at least in part on the response characteristic data, the behavioral data, and the natural language processing error data." At action 818 user satisfaction data may be generated based at least in part on the response characteristic data, the behavioral data, and the natural language processing error data. As described herein various different machine learning models may be used to generate the user satisfaction data 355 based on per-turn data (e.g., the behavioral data, response characteristic data, natural language processing error data, etc.). In some other examples, the user satisfaction data may be further based at least in part on user preference data (e.g., user preference data 392), session characteristic data (e.g., session characteristic data 390), aggregate characteristic data (e.g., aggregate characteristic data 388), feedback data (e.g., feedback data 382), and/or other types of relevant data generated by the natural language processing system. Training data including natural language processing characteristic data labeled with user satisfaction scores may be used to train the various machine learning models of user satisfaction estimator 350.

Among other potential benefits, a system in accordance with the present disclosure may generate user satisfaction data (e.g., user satisfaction scores) by inputting various feature signals (e.g., behavioral data, response characteristic data, session characteristic data, etc.) into one or more machine learning models of a user satisfaction estimator on a turn-by-turn basis. The user satisfaction data may be used to optimize response selection and/or to improve natural language processing applications using, for example, A/B analysis. The user satisfaction data may be used in to train an online dialog policy manager to generate an optimal response for a given user utterance or text input. Additionally, user satisfaction data may be stored and a data visualization dashboard may be provided to aggregate user satisfaction data over time. The data visualization dashboard may be effective to show user satisfaction at various levels of granularity so that natural language processing systems (e.g., application design, intent design, etc.) may be optimized.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving first input audio data corresponding to a first user request;
   determining, by a natural language processing system, a first computer-executable action corresponding to the first user request;
   determining, by the natural language processing system, a first application associated with the first computer-executable action;
   generating first instructions causing execution of the first computer-executable action by the first application;
   receiving second input audio data during execution of the first computer-executable action;
   determining that the second input audio data is for the natural language processing system;
   generating first data indicating that the second input audio data interrupted the first computer-executable action;
   determining, based on the first data, a first value representing an estimation of user satisfaction;
   determining a second computer-executable action based at least in part on the first value; and
   generating second instructions causing execution of the second computer-executable action by the first application.

2. The method of claim 1, further comprising:
   receiving third input audio data corresponding to a second user request;
   determining a first potential response and a second potential response for the third input audio data;
   determining a second value representing an estimation of user satisfaction for the first potential response;
   determining a third value representing an estimation of user satisfaction for the second potential response;
   determining that the third value indicates higher user satisfaction relative to the second value; and
   selecting the second potential response.

3. The method of claim 2, further comprising:
   storing the second value in a memory in association with data representing the second user request and data representing the first potential response;
   storing the third value in a memory in association with data representing the second user request and data representing the second potential response; and
   modifying the first application based at least in part on the second value and the third value.

4. The method of claim 1, further comprising:
   determining error data related to natural language processing of the first input audio data, wherein the first value is determined based on a combination of the error data and the first data.

5. The method of claim 1, further comprising:
   determining, by the natural language processing system, a first representation of the first input audio data;
   determining, by the natural language processing system, a second representation of the first input audio data; and
   generating, by a first machine learning model, the first value using the first representation, the second representation, and the first data.

6. The method of claim 1, wherein the first input audio data and the second input audio data are received during a first dialog session, the method further comprising:
   incrementing a barge-in count associated with the first dialog session in response to the first data indicating that the second input audio data interrupted the first computer-executable action; and generating the first value representing the estimation of user satisfaction using the barge-in count for the first dialog session.

7. The method of claim 1, further comprising:
generating, by a first machine learning model comprising a neural network, audio-based sentiment data representing a sentiment of the first input audio data; and
inputting the audio-based sentiment data and the first data into a second machine learning model trained to generate the estimation of user satisfaction using at least the audio-based sentiment data and the first data.

8. The method of claim 1, further comprising:
determining utterance rephrasing data indicating that the first input audio data corresponds to a rephrasing of a previous user input; and
inputting the utterance rephrasing data and the first data into a first machine learning model trained to generate the estimation of user satisfaction using at least the utterance rephrasing data and the first data.

9. The method of claim 1, further comprising:
determining first feature data comprising a raw feature generated by the natural language processing system during processing of at least the first input audio data;
determining second feature data comprising a derived feature computed from raw features;
determining third feature data comprising an output of a first machine learning model; and
generating the first value by inputting at least the first feature data, the second feature data, and the third feature data into a second machine learning model trained to generate the estimation of user satisfaction using a weighted combination of the first feature data, the second feature data, and the third feature data.

10. The method of claim 1, further comprising determining that the second input audio data is for the natural language processing system based at least in part on a wakeword detected in the second input audio data.

11. A system comprising:
at least one processor; and
at least one non-transitory computer-readable memory storing instructions that when executed by the at least one processor are effective to:
receive first input audio data corresponding to a first user request;
determine, by a natural language processing system, a first computer-executable action corresponding to the first user request;
determine, by the natural language processing system, a first application associated with the first computer-executable action;
generate first instructions causing execution of the first computer-executable action by the first application;
receive second input audio data during execution of the first computer-executable action;
determine that the second input audio data is for the natural language processing system;
generate first data indicating that the second input audio data interrupted the first computer-executable action;
determine, based on the first data, a first value representing an estimation of user satisfaction;
determine a second computer-executable action based at least in part on the first value; and
generate second instructions causing execution of the second computer-executable action by the first application.

12. The system of claim 11, the at least one non-transitory computer-readable memory storing further instructions that, when executed by the at least one processor, are further effective to:
receive third input audio data corresponding to a second user request;
determine a first potential response and a second potential response for the third input audio data;
determine a second value representing an estimation of user satisfaction for the first potential response;
determine a third value representing an estimation of user satisfaction for the second potential response;
determine that the third value indicates higher user satisfaction relative to the second value; and
select the second potential response.

13. The system of claim 12, the at least one non-transitory computer-readable memory storing further instructions that, when executed by the at least one processor, are further effective to:
store the second value in a memory in association with data representing the second user request and data representing the first potential response;
store the third value in a memory in association with data representing the second user request and data representing the second potential response; and
modify the first application based at least in part on the second value and the third value.

14. The system of claim 11, the at least one non-transitory computer-readable memory storing further instructions that, when executed by the at least one processor, are further effective to:
determine error data related to natural language processing of the first input audio data, wherein the first value is determined based on a combination of the error data and the first data.

15. The system of claim 11, the at least one non-transitory computer-readable memory storing further instructions that, when executed by the at least one processor, are further effective to:
determine, by the natural language processing system, a first representation of the first input audio data;
determine, by the natural language processing system, a second representation of the first input audio data; and
generate, by a first machine learning model, the first value using the first representation, the second representation, and the first data.

16. The system of claim 11, wherein the first input audio data and the second input audio data are received during a first dialog session, and wherein the at least one non-transitory computer-readable memory stores further instructions that, when executed by the at least one processor, are further effective to:
increment a barge-in count associated with the first dialog session in response to the first data indicating that the second input audio data interrupted the first computer-executable action; and
generate the first value representing the estimation of user satisfaction using the barge-in count for the first dialog session.

17. The system of claim 11, the at least one non-transitory computer-readable memory storing further instructions that, when executed by the at least one processor, are further effective to:
generate, by a first machine learning model comprising a neural network, audio-based sentiment data representing a sentiment of the first input audio data; and input the audio-based sentiment data and the first data into a second machine learning model trained to generate the estimation of user satisfaction using at least the audio-based sentiment data and the first data.

18. The system of claim 11, the at least one non-transitory computer-readable memory storing further instructions that, when executed by the at least one processor, are further effective to:
  determine utterance rephrasing data indicating that the second input audio data corresponds to a rephrasing of a previous user input; and
  input the utterance rephrasing data and the first data into a first machine learning model trained to generate the estimation of user satisfaction using at least the utterance rephrasing data and the first data.

19. A computer-implemented method of processing user-spoken commands, comprising:
  receiving first input audio data corresponding to a first user request;
  determining, by a natural language processing system, a first computer-executable action corresponding to the first user request;
  determining, by the natural language processing system, a first application associated with the first computer-executable action;
  determining, using a framework associated with the first application, a first resolved entity associated with the first user request, wherein the first resolved entity is associated with a song;
  generating first instructions causing execution of the first computer-executable action by the first application with the first resolved entity as a first input parameter;
  receiving second input audio data during the execution of the first computer-executable action;
  determining that the second input audio data comprises a wakeword;
  generating first data indicating that the second input audio data interrupted playback of the song;
  generating, using the first data, a first value representing an estimation of user satisfaction;
  determining a second resolved entity associated with the first user request based on the first value; and
  generating second instructions causing execution of the first computer-executable action by the first application with the second resolved entity as a second input parameter.

20. The computer-implemented method of claim 19, wherein the first input audio data and the second input audio data are received during a dialog session, the method further comprising:
  determining a first number of times the first computer-executable action was invoked during the dialog session;
  determining a second number of computer-executable actions invoked during the dialog session; and
  determining diversity data by dividing the first number by the second number, wherein the first value is determined using the diversity data.

* * * * *